(12) United States Patent
Oh et al.

(10) Patent No.: US 12,487,698 B2
(45) Date of Patent: Dec. 2, 2025

(54) TOUCH DISPLAY DEVICE AND DISPLAY PANEL

(71) Applicant: LG Display Co., Ltd., Seoul (KR)

(72) Inventors: Wooram Oh, Gyeongsangbuk-do (KR); YoungChul Kwon, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/736,233

(22) Filed: Jun. 6, 2024

(65) Prior Publication Data

US 2024/0329768 A1    Oct. 3, 2024

Related U.S. Application Data

(63) Continuation of application No. 18/185,745, filed on Mar. 17, 2023, now Pat. No. 12,032,778, which is a
(Continued)

(30) Foreign Application Priority Data

Jul. 2, 2021 (KR) .......... 10-2021-0086943

(51) Int. Cl.
*G06F 3/041* (2006.01)
*G06F 3/044* (2006.01)
*G09G 3/3225* (2016.01)

(52) U.S. Cl.
CPC ........ *G06F 3/04164* (2019.05); *G06F 3/0412* (2013.01); *G06F 3/04166* (2019.05);
(Continued)

(58) Field of Classification Search
CPC .. G06F 3/04164; G06F 3/0446; G06F 3/0412; G06F 2203/04112; G06F 3/04166; G09G 3/3225; G09G 2300/0842
(Continued)

(56) References Cited

U.S. PATENT DOCUMENTS 9,024,913 B1 * 5/2015 Jung .................... G09G 3/3655
345/174
2014/0240286 A1    8/2014 Chang et al.
(Continued)

FOREIGN PATENT DOCUMENTS

CN      107491213 A      12/2017
CN      109061929 A *    12/2018     ......... G02F 1/13338
(Continued)

*Primary Examiner* — Mark Edwards
(74) *Attorney, Agent, or Firm* — Seed Intellectual Property Law Group LLP

(57) ABSTRACT

A touch display device and a display panel uniformly distributing capacitances between the touch lines and the touch electrodes are provided. The device includes a display panel in which a plurality of X-touch electrodes are electrically connected to form a X-touch electrode line and a plurality of X-touch electrode lines arranged in parallel to receive a plurality of touch driving signals, and a plurality of Y-touch electrode lines to transmit a plurality of touch sensing signals, and a touch driving circuit. A plurality of X-touch lines transmit the touch driving signals connect together the plurality of X-touch electrodes constituting a same X-touch electrode line through a plurality of contact holes. Distances between at least one Y-touch electrode line and the plurality of contact holes through which the plurality of X-touch lines are electrically connected to the X-touch electrodes adjacent to the at least one Y-touch electrode line are uniform.

22 Claims, 18 Drawing Sheets

Related U.S. Application Data continuation of application No. 17/852,184, filed on Jun. 28, 2022, now Pat. No. 11,630,535.

(52) U.S. Cl.
CPC .. *G06F 3/0446* (2019.05); *G06F 2203/04112* (2013.01); *G09G 3/3225* (2013.01); *G09G 2300/0842* (2013.01)

(58) Field of Classification Search
USPC .......................................................... 345/173
See application file for complete search history.

(56) References Cited

U.S. PATENT DOCUMENTS

| | | | |
|---|---|---|---|
| 2014/0327632 A1 | 11/2014 | Roudbari et al. | |
| 2015/0277655 A1* | 10/2015 | Kim ..................... | G06F 3/0412 345/174 |
| 2018/0157354 A1 | 6/2018 | Blondin et al. | |
| 2018/0173346 A1 | 6/2018 | Du et al. | |
| 2018/0239488 A1 | 8/2018 | Lin et al. | |
| 2018/0373080 A1 | 12/2018 | Zou et al. | |
| 2019/0294282 A1* | 9/2019 | Dun ..................... | G06F 3/0412 |
| 2021/0096724 A1 | 4/2021 | Liu | |
| 2022/0035487 A1* | 2/2022 | Wang ................... | G06F 3/0412 |
| 2022/0179324 A1* | 6/2022 | Kim ..................... | G06F 3/0446 |

FOREIGN PATENT DOCUMENTS

| | | | | |
|---|---|---|---|---|
| CN | 109669572 A | * | 4/2019 | ............. G06F 3/041 |
| KR | 20210062178 A | | 5/2021 | |

* cited by examiner

TOUCH DISPLAY DEVICE AND DISPLAY PANEL

CROSS REFERENCE TO RELATED APPLICATION

This application is a continuation of U.S. patent application Ser. No. 18/185,745 filed Mar. 17, 2023, which is a continuation of U.S. patent application Ser. No. 17/852,184 filed Jun. 28, 2022, now U.S. Pat. No. 11,630,535 issued Apr. 18, 2023, which claims priority from Korean Patent Applications No. 10-2021-0086943, filed on Jul. 2, 2021, which are hereby incorporated by reference for all purposes as if fully set forth herein.

BACKGROUND

Technical Field

Embodiments of the present disclosure relate to a touch display device and a display panel, more specifically, a touch display device and a display panel in which touch lines are arranged such that capacitances are uniformly distributed.

Description of the Related Art

With the development of the information society, there has been an increasing demand for a variety of types of image display devices. In this regard, a range of display devices, such as liquid crystal display device, electroluminescence display device, or quantum dot light emitting display device have recently come into widespread use.

In order to provide more diverse functions, such a display device provides a function of detecting a user's finger touch or a pen touch on a display panel and performing a signal processing based on the detected touch data.

As an example, a touch display device capable of detecting a touch includes a plurality of touch electrodes disposed or embedded in the display panel, and may detect a presence of a user's touch and touch coordinates on the display panel by driving these touch electrodes.

Such a touch display device may be a mobile device such as a smart phone and a tablet PC, as well as a large-screen touch display device such as a display for automobiles and exhibitions.

In a case of a touch display device having a large screen, a time delay for transmitting the touch signal may be changed depending on positions of the touch electrodes as the size of the display panel increases.

BRIEF SUMMARY

The inventors have realized that as a length of the touch lines to transmit the touch signal increases, parasitic capacitance due to coupling between the touch lines and the touch electrodes increases, which may cause a problem in which touch sensitivity and touch sensing accuracy may be degraded. Accordingly, to address one or more technical problems in the related art including the above-identified problem, the inventors of the present disclosure invented a touch display device and a display panel capable of improving touch sensitivity and touch sensing accuracy by reducing a deviation for the time delay of the touch signal and uniformly distributing capacitances between the touch lines and the touch electrodes.

The problems to be described below according to the embodiments of the present disclosure are not limited to the problems mentioned above, and other problems that are not mentioned will be clearly understood by those skilled in the art from the following description.

A touch display device according to an embodiment of present disclosure includes a display panel in which a plurality of X-touch electrodes arranged in a first direction are electrically connected to form a X-touch electrode line and a plurality of X-touch electrode lines are arranged in parallel to receive a plurality of touch driving signals, and a plurality of Y-touch electrode lines are extended in a second direction to transmit a plurality of touch sensing signals; and a touch driving circuit for supplying the plurality of touch driving signals to the plurality of X-touch electrode lines and for sensing a touch by detecting the plurality of touch sensing signals from the plurality of Y-touch electrode lines, wherein a plurality of X-touch lines transmitting the plurality of touch driving signals are extended in the second direction and connect together the plurality of X-touch electrodes constituting a same X-touch electrode line through a plurality of contact holes, and wherein distances between at least one Y-touch electrode line and the plurality of contact holes through which the plurality of X-touch lines are electrically connected to the X-touch electrodes adjacent to the at least one Y-touch electrode line are uniform.

In the touch display device according to an embodiment of present disclosure, the plurality of X-touch electrode lines includes a shifting area in which remaining X-touch lines except for X-touch lines connected through the plurality of contact holes are shifted at a selected distance (or at a predetermined distance for some embodiments).

In the touch display device according to an embodiment of present disclosure, the distance at which the remaining X-touch lines are shifted in the shifting area corresponds to an interval between adjacent X-touch lines.

In the touch display device according to an embodiment of present disclosure, a direction in which the remaining X-touch lines are shifted in the shifting area is a horizontal direction towards an adjacent Y-touch electrode line.

In the touch display device according to an embodiment of present disclosure, a direction in which the remaining X-touch lines are shifted in the shifting region is a diagonal direction towards an adjacent Y-touch electrode line.

In the touch display device according to an embodiment of present disclosure, at least one X-touch line among the remaining X-touch lines shifted in the shifting area has a different shifting point from other X-touch lines.

In the touch display device according to an embodiment of present disclosure, a shifting point of an X-touch line adjacent to the Y-touch electrode line is formed at a higher position than a shifting point of other X-touch lines in the shifting area.

In the touch display device according to an embodiment of present disclosure, the shifting area is formed in an edge area that is far away from the touch driving circuit in the X-touch electrode line.

In the touch display device according to an embodiment of present disclosure, the plurality of contact holes through which the plurality of X-touch lines are electrically connected to the X-touch electrode are electrically connected to a plurality of bridge lines connecting the X-touch electrode lines located on both sides of the Y-touch electrode line.

In the touch display device according to an embodiment of present disclosure, an additional contact hole connected by the bridge line and an additional X-touch line electrically connected to the additional contact hole are formed at locations symmetrical with respect to the Y-touch electrode line.

In the touch display device according to an embodiment of present disclosure, the plurality of contact holes through which the plurality of X-touch lines are electrically connected to the X-touch electrode are formed in a corner area of the X-touch electrode adjacent to the Y-touch electrode line.

In the touch display device according to an embodiment of present disclosure, the contact hole through which the plurality of X-touch lines are electrically connected to the X-touch electrode is formed at a location opposite to a non-squared area when the display panel is a non-squared structure in which a touch electrode is not formed other than a squared structure.

In the touch display device according to an embodiment of present disclosure, at least one of the plurality of X-touch lines has a branch point to be branched into two X-touch lines, and same number of X-touch lines are arranged on both sides based on the branch point.

In the touch display device according to an embodiment of present disclosure, the branch point has a multi-level hierarchical structure, and five or less X-touch lines are connected on both sides based on a final branch point.

In the touch display device according to an embodiment of present disclosure, the plurality of X-touch lines are extended from a plurality of X-touch pads, and a loop structure is formed between the plurality of X-touch pads and the plurality of X-touch electrodes.

In the touch display device according to an embodiment of present disclosure, the branch point of a plurality of Y-touch lines transmitting the touch sensing signal from the plurality of Y-touch electrode lines is located within the loop structure of the X-touch line.

In the touch display device according to an embodiment of present disclosure, the X-touch electrode line is formed by X-touch electrodes with same shapes on both sides of the first direction based on the Y-touch electrode line.

In the touch display device according to an embodiment of present disclosure, the Y-touch electrode line is consisted of two bars and arranged in a split structure based on a first X-touch electrode, and the X-touch electrode line is formed by second X-touch electrodes with same shapes on both sides of the first direction based on the Y-touch electrode line, and the first X-touch electrode.

In the touch display device according to an embodiment of present disclosure, a width of the first X-touch electrode line is smaller than a width of the second X-touch electrodes, or a width of the second X-touch electrode lines is smaller than a width of the first X-touch electrode.

A display panel according to an embodiment of present disclosure includes a plurality of X-touch electrode lines arranged in parallel to receive a plurality of touch driving signals in which a plurality of X-touch electrodes arranged in a first direction are electrically connected to form a X-touch electrode line; a plurality of Y-touch electrode lines extended in a second direction to transmit a plurality of touch sensing signals; and a plurality of X-touch lines extending in the second direction to connect together a plurality of X-touch electrodes constituting a same X-touch electrode line through a plurality of contact holes and transmitting the plurality of touch driving signals, wherein distances between at least one Y-touch electrode line and the plurality of contact holes through which the plurality of X-touch lines are electrically connected to the X-touch electrodes adjacent to the at least one Y-touch electrode line are uniform.

According to embodiments of the present disclosure, it is possible to provide a touch display device and a display panel capable of improving touch sensitivity and touch sensing accuracy by reducing a deviation for the time delay of the touch signal and uniformly distributing capacitances between the touch lines and the touch electrodes.

The effects of the embodiments disclosed in the present disclosure are not limited to the above mentioned effects. In addition, the embodiments disclosed in the present disclosure may cause another effect not mentioned above, which will be clearly understood by those skilled in the art from the following description.

DETAILED DESCRIPTION

Figure 1:
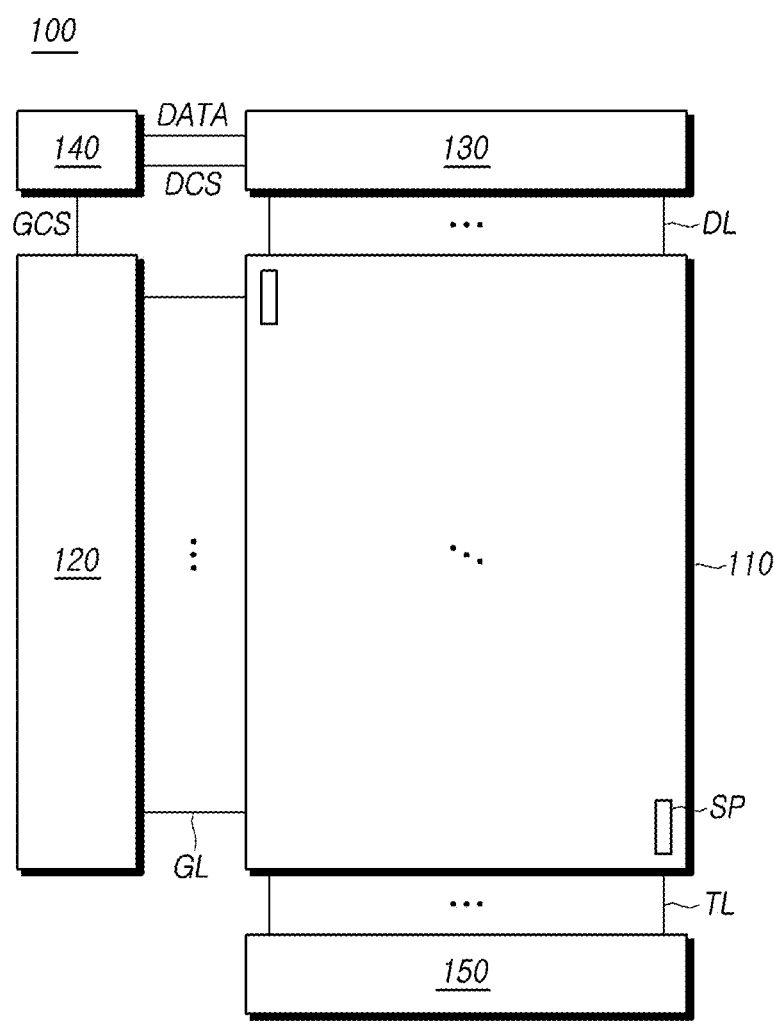
FIG. 1 illustrates a schematic diagram of a touch display device according to embodiments of the present disclosure.

The advantages and features of the present disclosure and methods of the realization thereof will be apparent with reference to the accompanying drawings and detailed descriptions of the embodiments. The present disclosure should not be construed as being limited to the embodiments set forth herein and may be embodied in a variety of different forms. Rather, these embodiments are provided so that the present disclosure will be thorough and complete, and will fully convey the scope of the present disclosure to those having ordinary knowledge in the technical field.

The shapes, sizes, dimensions (e.g., length, width, height, thickness, radius, diameter, area, etc.), ratios, angles, number of elements, and the like, inscribed in the drawings to illustrate embodiments are illustrative only, and the present disclosure is not limited to the embodiments illustrated in the drawings. Throughout this document, the same reference numerals and symbols will be used to designate the same or like components. In the following description of the present disclosure, detailed descriptions of known functions and components incorporated into the present disclosure will be omitted in the situation in which the subject matter of the present disclosure may be rendered unclear thereby. It will be understood that the terms "comprise," "include," "have," and any variations thereof used herein are intended to cover non-exclusive inclusions unless explicitly described to the contrary. Descriptions of components in the singular form used herein are intended to include descriptions of components in the plural form, unless explicitly described to the contrary.

In the analysis of a component, it shall be understood that an error range is included therein, even in the situation in which there is no explicit description thereof.

When spatially relative terms, such as "on," "above," "under," "below," and "on a side of," are used herein for descriptions of relationships between one element or component and another element or component, one or more intervening elements or components may be present between the one and other elements or components, unless a term, such as "directly," is used.

When temporally relative terms, such as "after," "subsequent," "following," and "before" are used to define a temporal relationship, a non-continuous case may be included unless the term "immediately" or "directly" is used.

In descriptions of signal transmission, such as "a signal is sent from node A to node B," a signal may be sent from node A to node B via another node unless the term "immediately" or "directly" is used.

In addition, terms, such as "first" and "second" may be used herein to describe a variety of components. It should be understood, however, that these components are not limited by these terms. These terms are merely used to discriminate one element or component from other elements or components. Thus, a first component referred to as first hereinafter may be a second component within the spirit of the present disclosure.

The features of embodiments of the present disclosure may be partially or entirely coupled or combined with each other and may work in concert with each other or may operate in a variety of technical methods. In addition, respective embodiments may be carried out independently or may be associated with and carried out in concert with other embodiments.

Hereinafter, a variety of embodiments will be described in detail with reference to the accompanying drawings.

FIG. 1 illustrates a schematic diagram of a touch display device according to embodiments of the present disclosure.

Referring to FIG. 1 the touch display device 100 according to embodiments of the present disclosure may include a display panel 110, a gate driving circuit 120, a data driving circuit 130, a timing controller 140 and a touch driving circuit 150 to detect a touch on the display panel 110.

A plurality of gate lines GL and a plurality of data lines DL are disposed in the display panel 110, and a plurality of subpixels SP are disposed in areas in which the gate lines GL overlaps the data lines DL.

In addition, a plurality of touch electrodes may be disposed on or within the display panel 110, and a plurality of touch lines TL electrically connecting the touch electrodes and the touch driving circuit 150 may be disposed in the display panel 110.

A display driving operation in the touch display device 100 would be described firstly, the gate driving circuit 120 controls the driving timing of the subpixels SP disposed in the display panel 110. In addition, the data driving circuit 130 supplies a data voltage corresponding to image data to the subpixels SP. Accordingly, the subpixels SP are displaying an image by illuminating a light having luminous intensities corresponding to grayscale levels of the image data.

Specifically, the gate driving circuit 120 is controlled by the timing controller 140, and controls the driving timing of the plurality of subpixels SP by sequentially supplying scan signals to the plurality of gate lines GL disposed in the display panel 110.

The gate driving circuit 120 may include one or more gate driving integrated circuits (GDIC), which may be disposed on one or both sides of the display panel 110, depending on the driving scheme. Alternatively, the gate driving circuit 120 may be implemented with a gate-in-panel (GIP) structure directly embedded in a bezel area of the display panel 110.

The data driving circuit 130 receives digital image data from the timing controller 140, and converts the received digital image data into an analog data voltage. In addition, the data driving circuit 130 supplies the data voltage to the respective data lines DL at time which the scan signals are supplied through the gate lines GL, so that the respective subpixels SP display luminous intensities according to the data voltage.

The data driving circuit 130 may include one or more source driving integrated circuits (SDICs).

The timing controller 140 supplies a variety of control signals to the gate driving circuit 120 and the data driving circuit 130, and controls the operations of the gate driving circuit 120 and the data driving circuit 130.

The timing controller 140 controls the gate driving circuit 120 to supply the scan signals according to timing realized by respective frames, converts source image data received from an external source into an image data DATA with a format readable by the data driving circuit 130, and supplies the converted image data DATA to the data driving circuit 130.

The timing controller 140 also receives a variety of timing signals, including a vertical synchronization signal, a horizontal synchronization signal, an input data enable signal, a clock signal, and the like, as well as the image data DATA from the external source (e.g., a host system).

The timing controller 140 may generate a data control signal DCS and a gate control signal GCS using the variety of timing signals received from the external source, and supply the control signals DCS, GCS to the data driving circuit 130 and the gate driving circuit 120, respectively.

For example, the timing controller 140 generates a variety of gate control signals GCS, including a gate start pulse signal, a gate shift clock signal, a gate output enable signal, and the like, to control the gate driving circuit 120.

Here, the gate start pulse signal is used to control the operation start timing of one or more gate driving integrated circuits in the gate driving circuit 120. The gate shift clock signal is a clock signal commonly supplied to the one or more gate driving integrated circuits to control the shift timing of the scan signals. The gate output enable signal designates timing information of the one or more gate driving integrated circuits.

In addition, the timing controller 140 generates a variety of data control signals DCS, including a source start pulse signal, a source sampling clock signal, a source output enable signal, and the like, to control the data driving circuit 130.

Here, the source start pulse signal is used to control the data sampling start timing of one or more source driving integrated circuits in the data driving circuit 130. The source sampling clock signal is a clock signal for controlling the sampling timing of data voltage in each of the source driving integrated circuits. The source output enable signal controls the output timing of the data driving circuit 130.

The touch display device 100 may further include a power management integrated circuit for supplying various types of voltage or current to the display panel 110, the gate driving circuit 120, the data driving circuit 130, and the like, or controlling various types of voltage or current to be supplied to the same.

The subpixels SP are defined adjacent to the overlapping locations of the gate lines GL and the data lines DL. Liquid crystals or light emitting elements may be disposed in the subpixels SP, depending on the type of the touch display device 100.

For example, in a case in which the touch display device 100 is a liquid crystal display device, the touch display device 100 includes a light source device, such as a backlight unit, to illuminate the display panel 110, and liquid crystals are disposed in the subpixels SP of the display panel 110. In addition, the touch display device 100 may display luminous intensities and an image data by adjusting the alignment of the liquid crystals using electromagnetic fields generated in response to the data voltage supplied to the subpixels SP.

In the case of a liquid crystal display device, the display panel 110 includes a liquid crystal layer formed between two substrates, and it may be operated in any known mode such as Twisted Nematic (TN) mode, Vertical Alignment (VA) mode, In Plane Switching (IPS) mode, or Fringe Field Switching (FFS) mode. On the other hand, in the case of an electroluminescent display device, the display panel 110 may be implemented in a top emission type, a bottom emission type, or a dual emission type.

In addition, the touch display device 100 according to embodiments of the present disclosure may detect a user's touch on the display panel 110 using the touch electrodes TE included in the display panel 110, and the touch driving circuit 150.

Figure 2:
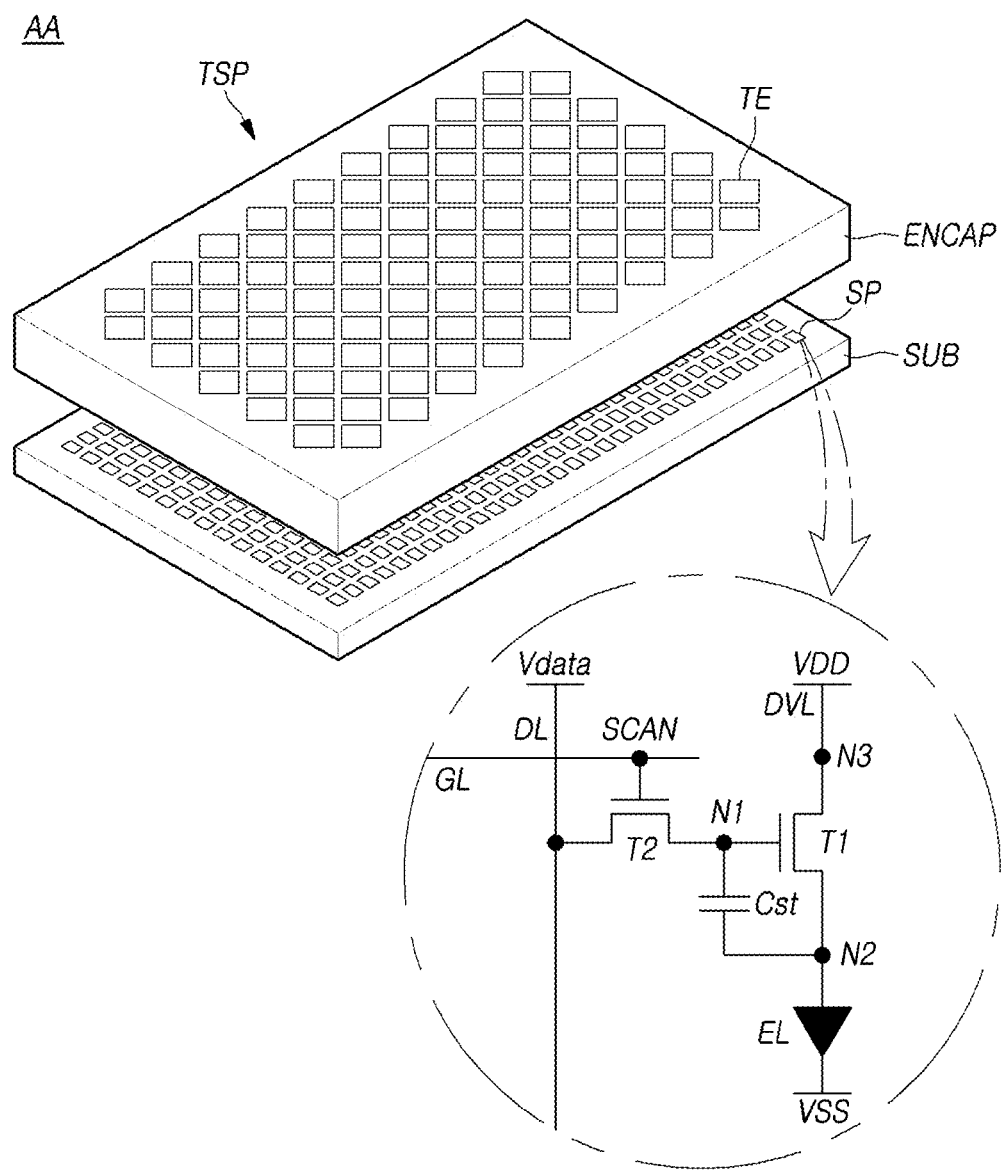
FIG. 2 illustrates a structure in which a touch screen panel is embedded in a display panel of a touch display device according to embodiments of the present disclosure.

FIG. 2 illustrates a structure in which a touch screen panel is embedded in a display panel of a touch display device according to embodiments of the present disclosure.

Referring to FIG. 2, a plurality of subpixels SP may be disposed on a substrate SUB in an active area AA of the display panel 110 in the touch display device 100 according to embodiments of the present disclosure.

Each subpixel SP may include a light emitting diode EL, a first transistor T1 for driving the light emitting diode EL, a second transistor T2 for transmitting a data voltage Vdata to a first node N1 of the first transistor T1, and a storage capacitor Cst for maintaining a constant voltage for one frame.

The first transistor T1 may include a first node N1 to which a data voltage Vdata may be supplied through the second transistor T2, a second node N2 electrically connected to the light emitting diode EL, and a third node N3 to which a driving voltage VDD is supplied from a driving voltage line DVL. The first node N1 may be a gate node, the second node N2 may be a source node or a drain node, and the third node N3 may be a drain node or a source node. The first transistor T1 may also be referred to as a driving transistor for driving the light emitting diode EL.

The light emitting diode EL may include a first electrode (e.g., an anode electrode), a light emitting layer, and a second electrode (e.g., a cathode electrode). The first electrode may be electrically connected to the second node N2 of the first transistor T1, and the second electrode may be supplied with a base voltage VSS.

The light emitting layer of the light emitting diode EL may be an organic light emitting layer containing an organic material. In this case, the light emitting diode EL may be an organic light emitting diode.

The second transistor T2 may be controlled to be turned on and off by a scan signal SCAN supplied through a gate line GL, and may be electrically connected between the first node N1 of the first transistor T1 and the data line DL. The second transistor T2 may also be referred to as a switching transistor.

When the second transistor T2 is turned on by the scan signal SCAN, a data voltage Vdata supplied through the data line DL is transmitted to the first node N1 of the first transistor T1.

The storage capacitor Cst may be electrically connected between the first node N1 and the second node N2 of the first transistor T1.

Each subpixel SP may have a 2T1C structure including two transistors T1, T2 and one capacitor Cst, and may further include one or more transistors, or may further include one or more capacitors in some cases.

The storage capacitor Cst may be an external capacitor which is intentionally designed to be provided outside the first transistor T1, instead of a parasitic capacitor which is provided between the first node N1 and the second node N2 of the first transistor T1.

Each of the first transistor T1 and the second transistor T2 may be an n-type transistor or a p-type transistor.

On the other hand, circuit elements such as a light emitting diode EL, two or more transistors T1, T2, and one or more capacitors Cst, may be disposed in the display panel 110. Since the circuit elements are vulnerable to external moisture or oxygen, an encapsulation layer ENCAP for preventing external moisture or oxygen from penetrating into the circuit elements may be disposed in the display panel 110.

The encapsulation layer ENCAP may be formed of one layer, but may also be formed of a plurality of layers. For example, when the encapsulation layer ENCAP includes a plurality of layers, the encapsulation layer ENCAP may include one or more inorganic encapsulation layers and one or more organic encapsulation layers. As a specific example, the encapsulation layer ENCAP may include a first inorganic encapsulation layer, an organic encapsulation layer, and a second inorganic encapsulation layer. Here, the organic encapsulation layer may be located between the first inorganic encapsulation layer and the second inorganic encapsulation layer. However, the configuration of the encapsulation layer ENCAP is not limited thereto.

The first inorganic encapsulation layer may be arranged on a second electrode (e.g., a cathode electrode) to be most adjacent to the light emitting diode EL. The first inorganic encapsulation layer may be, for example, made of an inorganic insulation material that can be deposited at a low temperature, such as silicon nitride (SiNx), silicon oxide (SiOx), silicon oxynitride (SiON), or aluminum oxide ($Al_2O_3$). Since the first inorganic encapsulation layer is deposited at a low temperature, the first inorganic encapsulation layer may prevent damage to the light emitting layer (e.g., organic light emitting layer) that is vulnerable to a high temperature during a deposition process.

The organic encapsulation layer may be formed to have an area smaller than the first inorganic encapsulation layer. In this case, the organic encapsulation layer may be formed to expose both ends of the first inorganic encapsulation layer. The organic encapsulation layer may have a role of buffering stress between respective layers as a result of bending of the touch display device 100, and may have a role of enhancing the planarization performance. For example, the organic encapsulation layer may be made of an organic insulation material, such as acrylic resin, epoxy resin, polyimide, polyethylene, or silicon oxycarbide (SiOC).

The second inorganic encapsulation layer may be formed on the organic encapsulation layer to cover the upper surface and side surface of each of the organic encapsulation layer and the first inorganic encapsulation layer. The second inorganic encapsulation layer reduces or blocks infiltration of external moisture or oxygen into the first inorganic encapsulation layer and the organic encapsulation layer. For example, the second inorganic encapsulation layer may be made of an inorganic insulation material such as silicon nitride (SiNx), silicon oxide (SiOx), silicon oxynitride (SiON), or aluminum oxide ($Al_2O_3$).

The touch screen panel TSP may be embedded in the display panel 110 by being disposed on the encapsulation layer ENCAP in the touch display device 100 according to embodiments of the present disclosure. For example, a plurality of touch electrodes TE constituting the touch screen panel TSP may construct the display panel 110 by being disposed on the encapsulation layer ENCAP in the touch display device 100.

The touch display device 100 may sense a touch based on mutual-capacitance scheme or a self-capacitance scheme, as a capacitance based touch sensing scheme.

In case of a touch sensing scheme based on mutual-capacitance, a plurality of touch electrodes TE may be classified as touch driving electrodes which is supplied touch driving signals through touch driving lines, and touch sensing electrodes which supplies touch sensing signals through touch sensing lines and forms capacitances with the touch driving electrodes. Here, the touch driving lines and the touch sensing lines may be referred to as touch lines. Also, the touch driving signals and the touch sensing signals may be referred to as touch signals.

In case of the touch sensing scheme based on mutual-capacitance, the touch presence and the touch coordinate may be detected based on a change of mutual-capacitance formed between the touch driving electrode and the touch sensing electrode according to a presence of a pointer such as a finger, a pen, or the like.

In case of the touch sensing scheme based on self-capacitance, each touch electrode serves as both the touch driving electrode and the touch sensing electrode. That is, a touch driving signal is supplied to a touch electrode TE through a touch line, and a touch sensing signal generated in the touch electrode, to which the touch driving signal is supplied, is transmitted through the same touch line. Accordingly, in case of the touch sensing scheme based on self-capacitance, there is no distinction between the touch driving electrode and the touch sensing electrode and no distinction between the touch driving line and the touch sensing line.

In case of the touch sensing scheme based on self-capacitance, the touch presence and a touch coordinate may be detected based on a change in capacitance formed between a pointer such as a finger, a pen, or the like, and a touch electrode TE.

Thus, the touch display device 100 may sense a touch by the touch sensing scheme based on mutual-capacitance or the touch sensing scheme based on self-capacitance.

Figure 3:
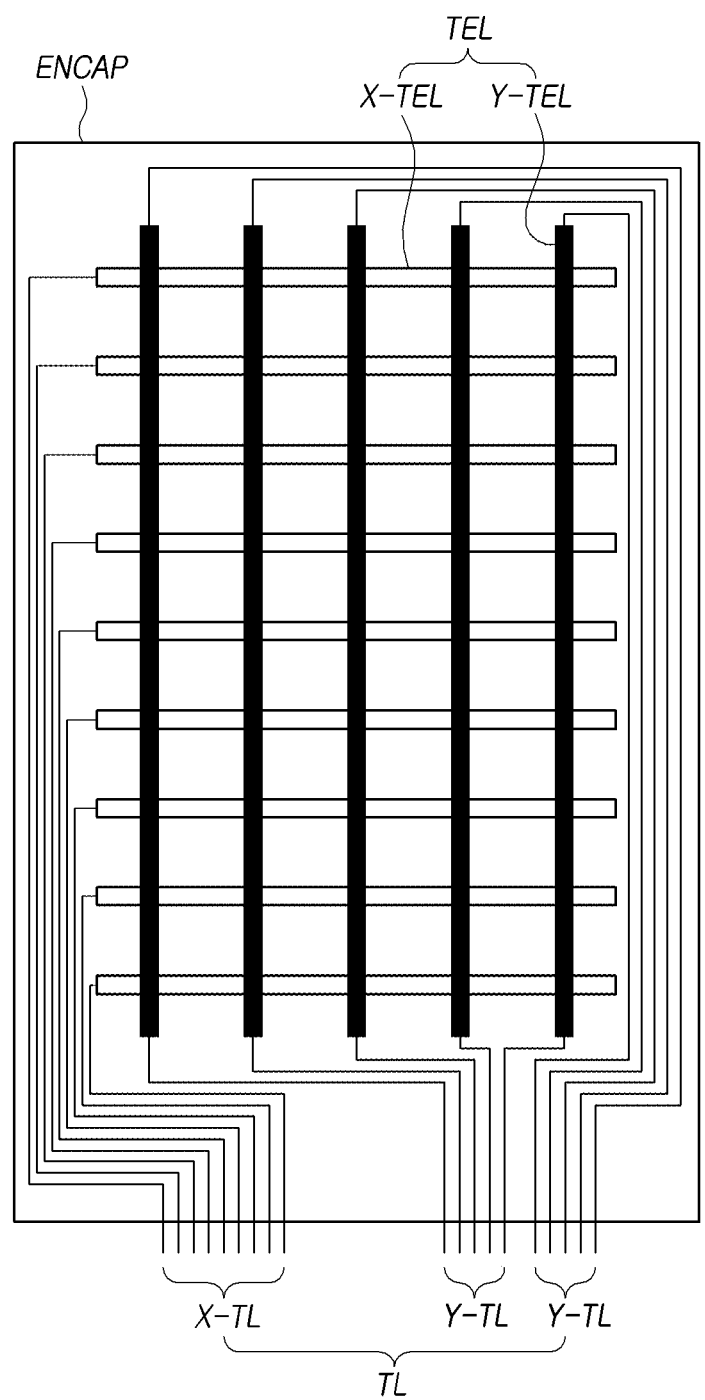
FIG. 3 illustrates a structure of touch electrodes for touch sensing operation based on mutual-capacitance in a touch display device according to embodiments of the present disclosure.

FIG. 3 illustrates a structure of touch electrodes for touch sensing operation based on mutual-capacitance in a touch display device according to embodiments of the present disclosure.

Referring to FIG. 3, the structure of touch electrodes for touch sensing operation based on mutual-capacitance in the touch display device 100 according to embodiments of the present disclosure may include a plurality of X-touch electrode lines X-TEL and a plurality of Y-touch electrode lines Y-TEL. Here, the plurality of X-touch electrode lines X-TEL and the plurality of Y-touch electrode lines Y-TEL may be located on the encapsulation layer ENCAP.

A plurality of X-touch electrode lines X-TEL may be disposed in a first direction (e.g., X-axis), and a plurality of Y-touch electrode lines Y-TEL may be disposed in a second direction (e.g., Y-axis) different from the first direction.

In the present specification, the first direction and the second direction may be relatively different directions. For example, the first direction may be an X-axis direction and the second direction may be a Y-axis direction. Conversely, the first direction may be the Y-axis direction and the second direction may be the X-axis direction. Further, the first direction and the second direction may be orthogonal to each other, but may not be orthogonal to each other. Also, rows and columns in the present specification are relative, and the rows and columns may be changed according to a viewing point of view.

Each of the plurality of X-touch electrode line X-TEL may be composed of a plurality of electrically connected X-touch electrodes, and each of the plurality of Y-touch electrode line Y-TEL may be composed of a plurality of electrically connected Y-touch electrodes.

Here, the plurality of X-touch electrodes and the plurality of Y-touch electrodes correspond to a plurality of touch electrodes TE having different roles (functions) respectively.

For example, the plurality of X-touch electrodes constituting the X-touch electrode line X-TEL may be touch driving electrodes, and the plurality of Y-touch electrodes constituting the Y-touch electrode line Y-TEL may be touch sensing electrodes. In this case, the plurality of X-touch electrode lines X-TEL will correspond to a plurality of touch driving electrode lines, and the plurality of Y-touch electrode lines Y-TEL will correspond to a plurality of touch sensing electrode lines.

Conversely, the plurality of X-touch electrodes constituting the plurality of X-touch electrode lines X-TEL may be touch sensing electrodes, and the plurality of Y-touch electrodes constituting the plurality of Y-touch electrode lines Y-TEL may be touch driving electrodes. In this case, the plurality of X-touch electrode lines X-TEL will correspond to a plurality of touch sensing electrode lines, and the plurality of Y-touch electrode lines Y-TEL will correspond to a plurality of touch driving electrode lines.

A touch sensor metal for touch sensing may include a plurality of touch lines TL in addition to the plurality of X-touch electrode lines X-TEL and the plurality of Y-touch electrode lines Y-TEL.

The plurality of touch lines TL may include at least one X-touch line X-TL connected to the plurality of X-touch electrode lines X-TEL, and at least on Y-touch line Y-TL connected to the plurality of Y-touch electrode lines Y-TEL.

This touch display device 100 may be used in mobile devices such as smartphones and tablet PCs, and may be used in large-screen display devices such as automobile displays and exhibition displays.

In particular, in the case of the large-screen touch display device 100, the length of the touch electrode line TEL formed of a plurality of touch electrodes may be increased as the size of the display panel 110 increases. Accordingly, a time delay in which a touch signal (a touch driving signal or a touch sensing signal) is transmitted may increase depending on positions of the touch electrode. As a result, the uniformity of the image displayed through the display panel 110 may be reduced.

In order to reduce the time delay of the touch signal, the touch lines may be configured in a multi-feeding structure so that the touch signal may be simultaneously supplied to a plurality of touch electrodes constituting a same touch electrode line TEL.

Figure 4:
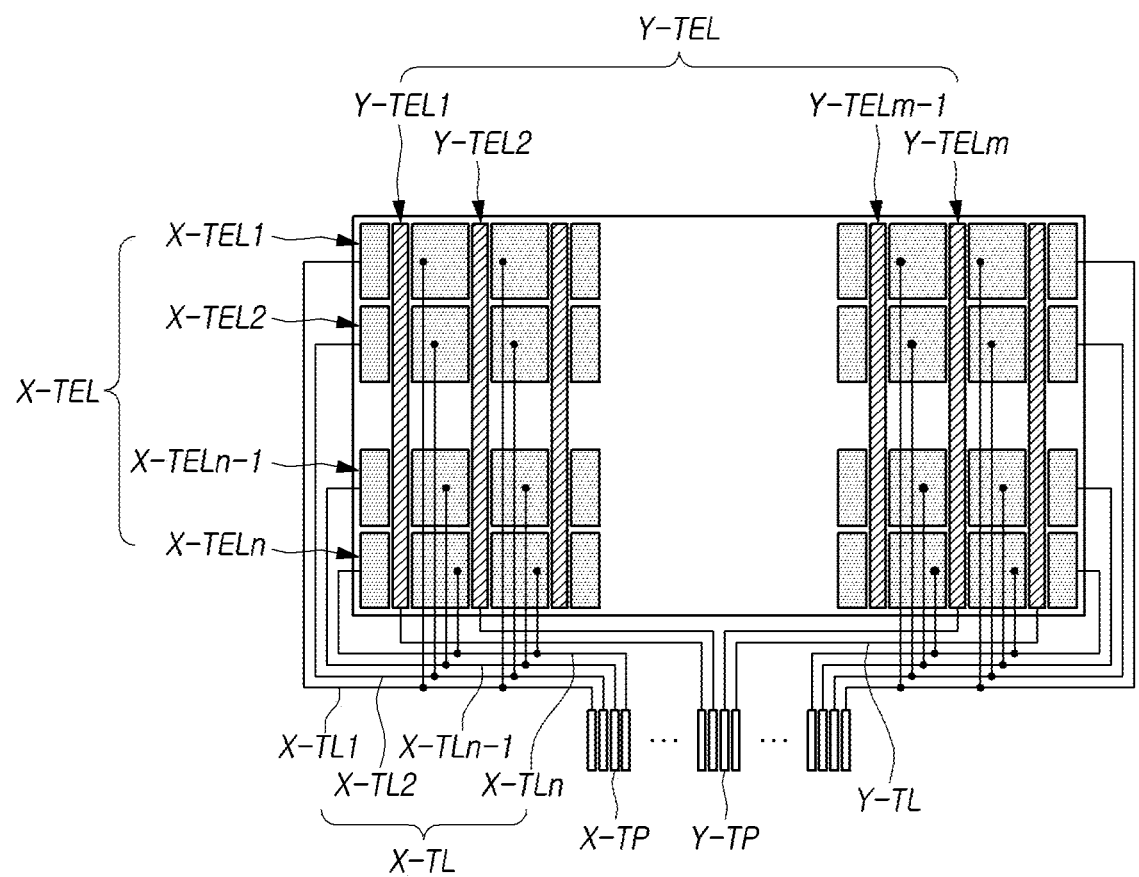
FIG. 4 illustrates a display panel with a multi-feeding structure in which a touch signal is simultaneously supplied to a plurality of touch electrodes disposed at same line in a touch display device according to an embodiment of the present disclosure.

FIG. 4 illustrates a display panel with a multi-feeding structure in which a touch signal is simultaneously supplied to a plurality of touch electrodes disposed at same line in a touch display device according to an embodiment of the present disclosure.

Referring to FIG. 4, the touch display device 100 according to an embodiment of the present disclosure may be configured in a multi-feeding structure so that a touch signal is simultaneously supplied to a plurality of touch electrodes constituting the same touch electrode line TEL in order to reduce a time delay of a touch signal.

At this time, when a plurality of X-touch electrodes arranged in the X-axis direction constitute one X-touch electrode line X-TEL, the plurality of X-touch electrodes disposed at the same line may be connected by a same X-touch line X-TL to supply a touch signal simultaneously to the plurality of X-touch electrodes constituting a X-touch electrode line X-TEL.

Otherwise, when a plurality of Y-touch electrodes arranged in the Y-axis direction constitute one Y-touch electrode line Y-TEL, the plurality of Y-touch electrodes disposed at the same line may be connected by a same Y-touch line Y-TL to supply a touch signal simultaneously to the plurality of Y-touch electrodes constituting a Y-touch electrode line Y-TEL.

Here, it has illustrated a case that the X-touch electrode line X-TEL in the X-axis direction is composed of a plurality of X-touch electrodes, and the Y-touch electrode line Y-TEL in the Y-axis direction is composed of one Y-touch electrode, respectively. Accordingly, a plurality of X-touch electrodes arranged in the same row in the X-axis direction may be connected by the same X-touch line X-TL.

For example, the X-touch electrode line X-TEL1 in the first row may be composed of a plurality of X-touch electrodes arranged in the first row, and a plurality of X-touch electrodes arranged in the first row may be electrically connected to a branched first X-touch line X-TL1, respectively, so that the first touch signal may be simultaneously transmitted.

Accordingly, since the touch signal is simultaneously supplied to the plurality of X-touch electrodes arranged in the X-axis direction, the delay of the touch signal for the plurality of X-touch electrodes is reduced, so that the touch performance may be uniform for the entire screen of the display panel 110.

For example, when the plurality of X-touch electrodes arranged in the X-axis direction are touch driving electrodes, the plurality of X-touch electrodes constituting one X-touch electrode line X-TEL are electrically connected by the same X-touch line X-TL, and may receive the same touch driving signal at the same time.

A plurality of X-touch electrode lines X-TEL1, ..., X-TELn may be respectively connected to corresponding X-touch pads X-TP through respective X-touch lines X-TL1, ..., X-TLn. For example, the plurality of X-touch electrodes included in the first X-touch electrode line X-TEL1 may be electrically connected to the corresponding X-touch pad X-TP through the first X-touch line X-TL1.

On the other hand, since respective Y-touch electrode line Y-TEL1, ..., Y-TELm is composed of one Y-touch electrode, each Y-touch electrode lines Y-TEL1, ..., Y-TELm may be electrically connected to a corresponding Y-touch pad Y-TP through one Y-touch line Y-TL.

In this case, a structure for branching one touch line in order to connect one touch line to a plurality of touch electrodes constituting the same touch electrode line TEL may be variously changed.

FIGS. 5A to 5D illustrate branching structures of a touch line for connecting to a plurality of touch electrodes in a touch display device according to an embodiment of the present disclosure.

Here, it has illustrated a case in which one X-touch electrode line X-TEL is composed of 20 X-touch electrodes X-TE arranged in the X-axis direction as an example. Accordingly, the 20 X-touch electrodes X-TE are arranged in the same row of the X-axis direction, and may receive the same touch signal since they are connected by the same X-touch line X-TL. As a result, an X-touch line X-TL extending from one X-touch pad X-TP are branched into 20 to be respectively connected 20 X-touch electrodes X-TE constituting one X-touch electrode line X-TEL.

Figure 5A:
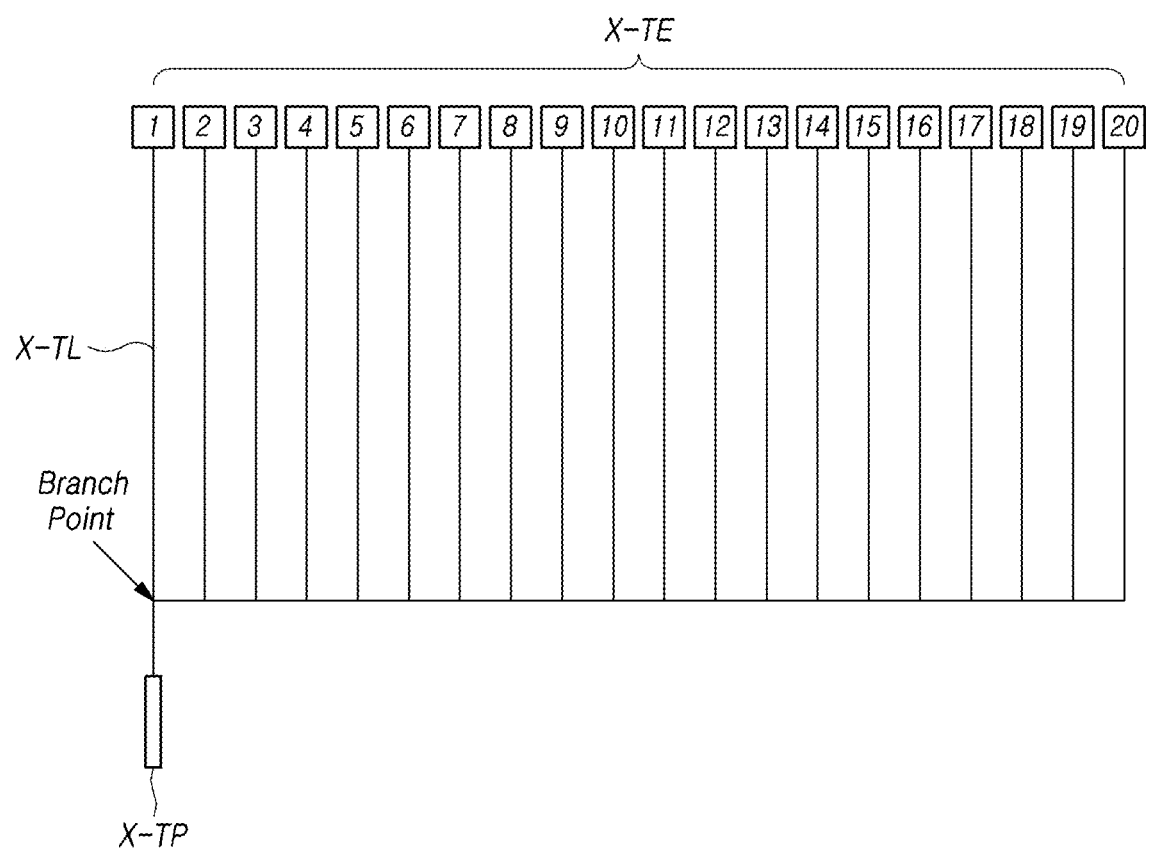
FIGS. 5A to 5D illustrate branching structures of a touch line for connecting to a plurality of touch electrodes in a touch display device according to an embodiment of the present disclosure.

In this case, the position of the X-touch pad X-TP may be variously selected. In FIG. 5A, it has illustrated a cast that the X-touch pad X-TP corresponds to the position of an X-touch electrode located at the leftmost from among the 20 X-touch electrodes X-TE. In this case, since the X-touch line X-TL extending from the X-touch pad X-TP may be branched on the vertical extension line of the X-touch pad X-TP, the branch point may correspond to the position of the first X-touch electrode located at the leftmost among the 20 X-touch electrodes X-TE. Accordingly, in the case of FIG. 5A, the number of X-touch electrodes X-TE connected by the same X-touch line X-TL based on the branch point may be 20 on the right side.

Figure 5B:
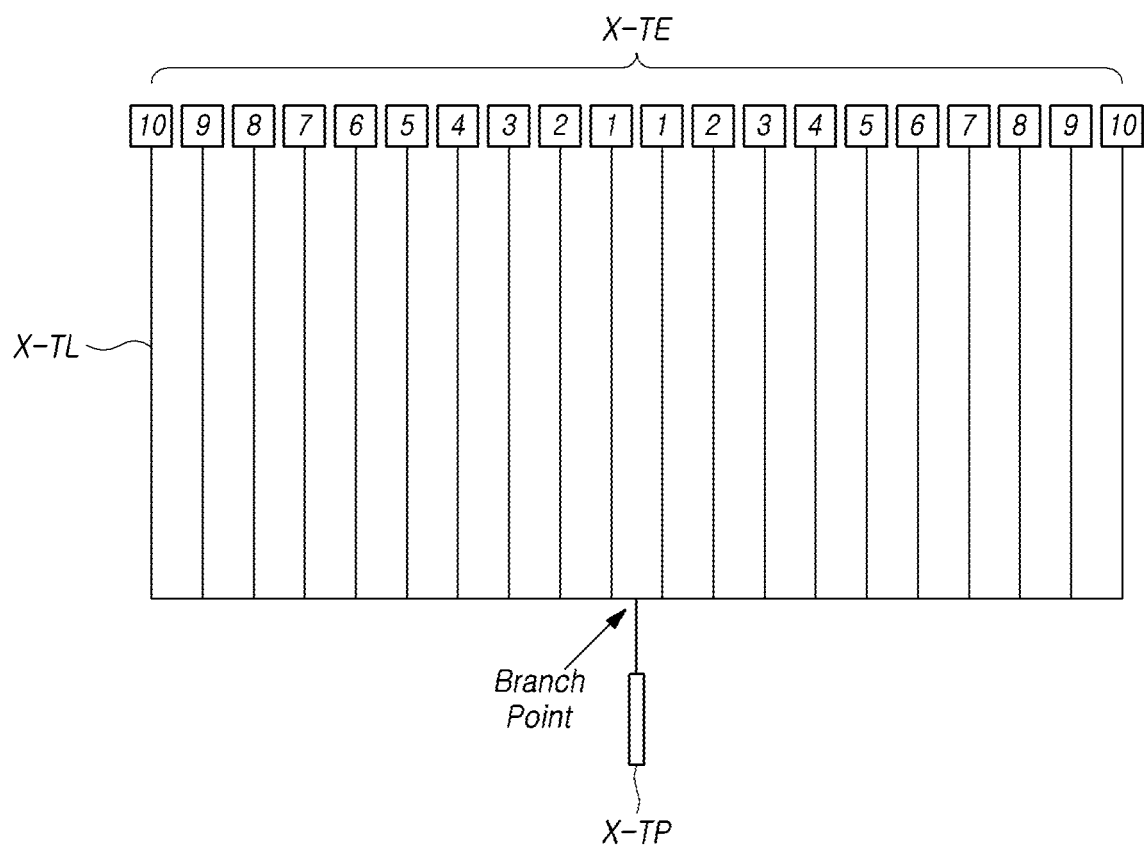

On the other hand, FIG. 5B illustrates a case in which the X-touch pad X-TP corresponds to the position of the center of the 20 X-touch electrodes X-TE. In this case, since the X-touch line X-TL extending from the X-touch pad X-TP may be branched on the vertical extension line of the X-touch pad X-TP, the branch point is 20 may correspond to the position of the center of the 20 X-touch electrodes X-TE. Therefore, when the branch point corresponds to the position of the center of the X-touch electrodes X-TE as shown in FIG. 5B, the number of X-touch electrodes X-TE being connected by the same X-touch line X-TL based on the branch point may be 10, which is ½ of the total number of 20, respectively, for the left and right sides of the branch point.

Figure 5C:
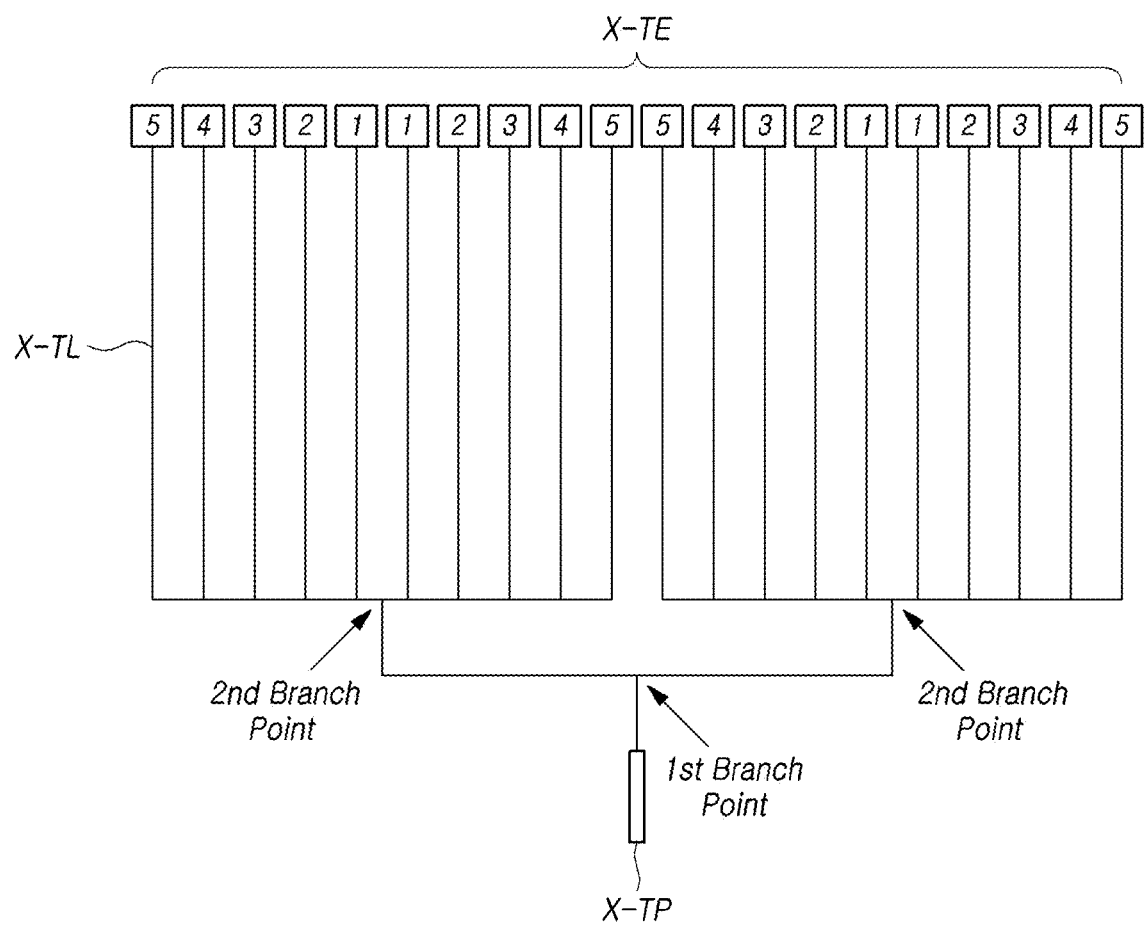

Alternatively, the branch point at which the X-touch line X-TL is divided may be configured in a hierarchical structure with two or more levels. FIG. 5C illustrates a case that the X-touch pad X-TP corresponds to the position of the center of the 20 X-touch electrodes X-TE, and the branch point is formed in a two-level hierarchical structure.

In this case, since the X-touch line X-TL extending from the X-touch pad X-TP may be branched first on the vertical extension line of the X-touch pad X-TP, the first branch point may correspond to the position of the center of the 20 X-touch electrodes X-TE. The two X-touch lines X-TL branched at the first branch point may correspond to 10 X-touch electrodes X-TE, respectively, and may be branched again at the second branch point. Accordingly, the X-touch line X-TL being branched at the second branch point may be respectively connected to five X-touch electrodes X-TE for the left and right sides based on the second branch point.

As such, if the X-touch line X-TL extending from the X-touch pad X-TP is configured in a multi-level hierarchical structure, a time delay of a touch signal may be more effectively reduced since the number of the X-touch electrodes X-TE connected together based on the branch point is reduced.

On the other hand, when both the X-touch line X-TL and the Y-touch line Y-TL have a branched structure, sensitivity for touch sensing may be reduced because of a parasitic capacitance between the adjacent X-touch line X-TL and the Y-touch line Y-TL.

Figure 5D:
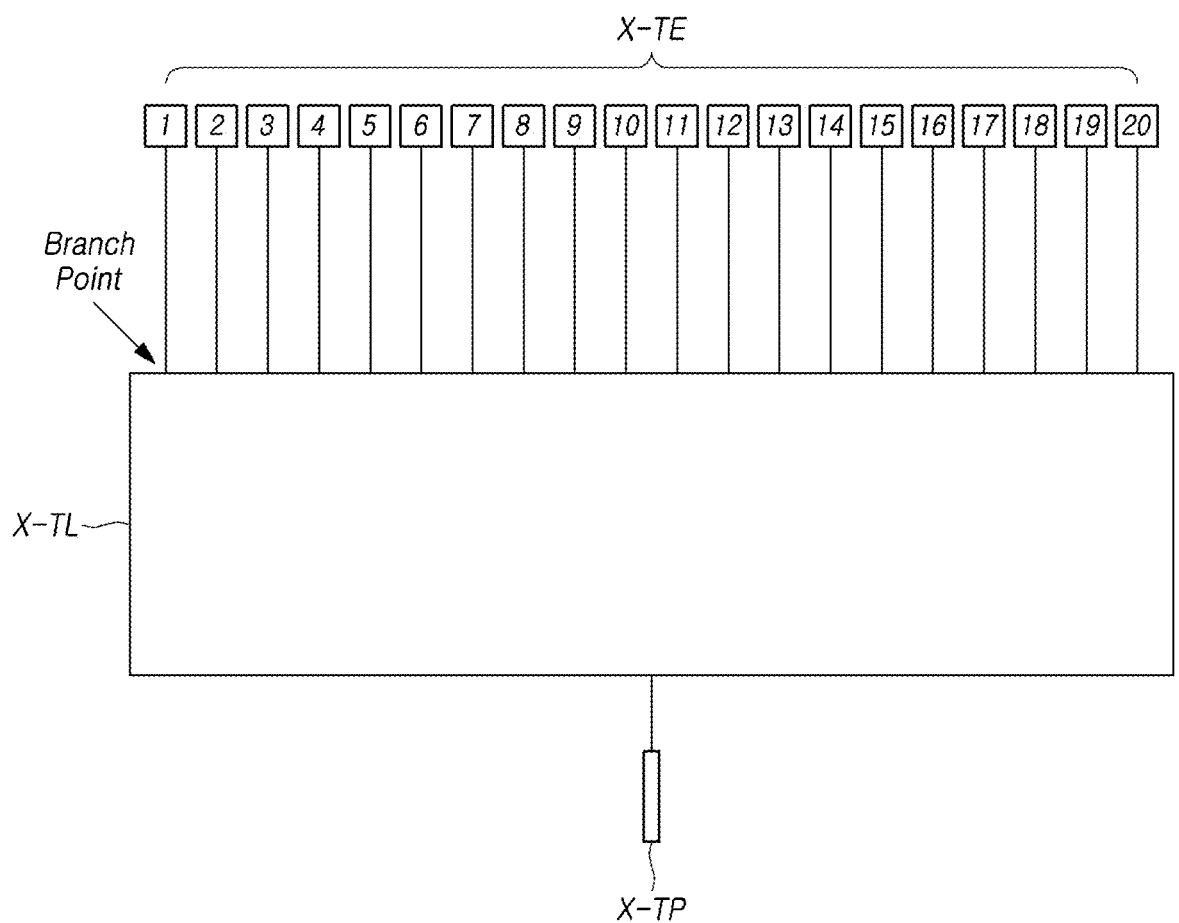

To solve the above problem, one of the X-touch line X-TL and the Y-touch line Y-TL may be formed in a loop shape. FIG. 5D illustrates a case in which the X-touch line X-TL is arranged in the loop shape between the X-touch pad X-TP and the X-touch electrode X-TE as an example.

Accordingly, the X-touch line X-TL may be respectively connected to corresponding X-touch electrode X-TE by extending from a branch point close to the X-touch electrode X-TE in a structure with loop shape.

As described above, when the X-touch line X-TL is formed in a loop shape between the X-touch pad X-TP and the X-touch electrode X-TE, the effect of parasitic capacitance may be reduced by forming a space with a certain size in the X-touch line X-TL.

In addition, since the coupling between the Y-touch lines Y-TL may be uniformly formed by the X-touch line X-TL with a loop shape, the non-uniformity effect caused by the parasitic capacitance may be reduced.

In addition, since the branch point of the X-touch line X-TL extending from the X-touch line X-TL with a loop shape to the X-touch electrode X-TE may be located at a position close to the X-touch electrode X-TE, the signal delay of the touch driving signal may be reduced.

On the other hand, when the X-touch line X-TL is formed in a loop shape between the X-touch pad X-TP and the X-touch electrode X-TE, the Y-touch line Y-TL may be formed in the branch structure of FIGS. 5A to 5C, and the branch point is disposed within the loop structure of the X-touch line X-TL.

Figure 6:
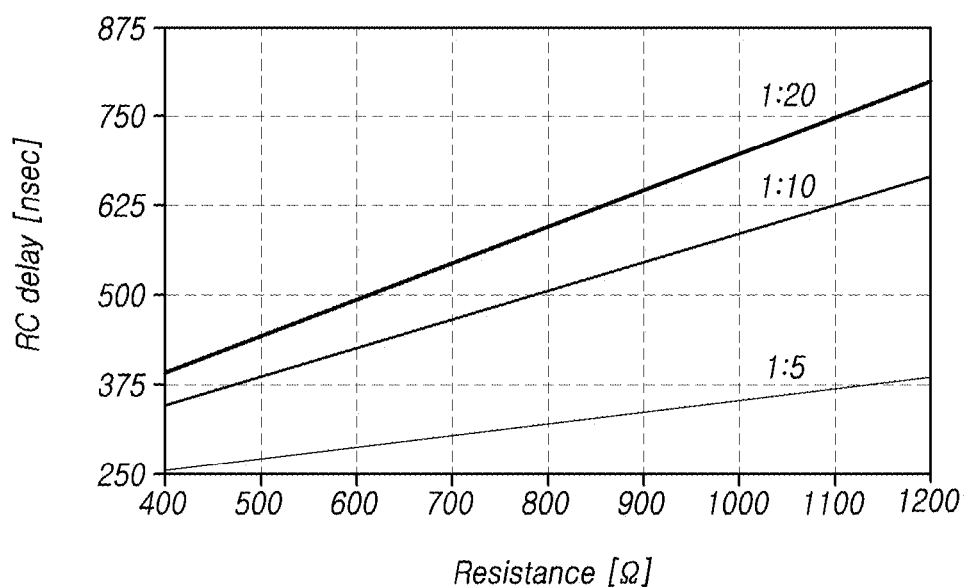
FIG. 6 illustrates a graph of a time delay for a touch signal depending on the number of touch electrodes connected to same touch line based on a branch point in the touch display device according to an embodiment of the present disclosure.

FIG. 6 illustrates a graph of a time delay for a touch signal depending on the number of touch electrodes connected to same touch line based on a branch point in the touch display device according to an embodiment of the present disclosure.

Referring to FIG. 6, it can be seen that the time delay for the touch signal is reduced as the number of touch electrodes TE connected to the same touch line TL based on the branch point decreases in the touch display device according to an embodiment of the present disclosure.

For example, the time delay for the touch signal is reduced when the number of X-touch electrodes X-TE connected to the same X-touch line X-TL based on the branch point is 10 (in the case of FIG. 5B) comparing that the number of X-touch electrodes X-TE connected to the same X-touch line X-TL based on a branch point is 20 (in the case of FIG. 5A). In addition, the time delay for the touch signal may be further reduced when the number of X-touch electrodes X-TE connected to the same X-touch line X-TL based on the second branch point using a multi-level hierarchical structure is 5 (in the case of FIG. 5C).

It can be seen that this reduction of time delay is proportional to the number of touch electrodes X-TE connected to the same X-touch line X-TL based on the branch point, even when the total resistance of the X-touch line X-TL increases.

Therefore, when a plurality of X-touch electrodes X-TE arranged in the X-axis direction constitute one X-touch electrode line X-TEL, the time delay for the touch signal may be reduced by forming the branch point in the multi-level hierarchical structure and reducing the number of X-touch electrodes X-TE connected to the same X-touch line X-TL based on the branch point.

On the other hand, when the touch line TL is formed in a multi-feeding structure in order to simultaneously supply a touch driving signal to a plurality of touch driving electrodes constituting the touch driving electrode line (e.g., X-TEL), parasitic capacitance may be induced due to a distance between the touch driving line (e.g., X-TL) supplying the touch driving signal and the touch sensing electrode line (e.g., Y-TEL) transmitting the touch sensing signal, which leads to a decrease in touch performance.

Figure 7:
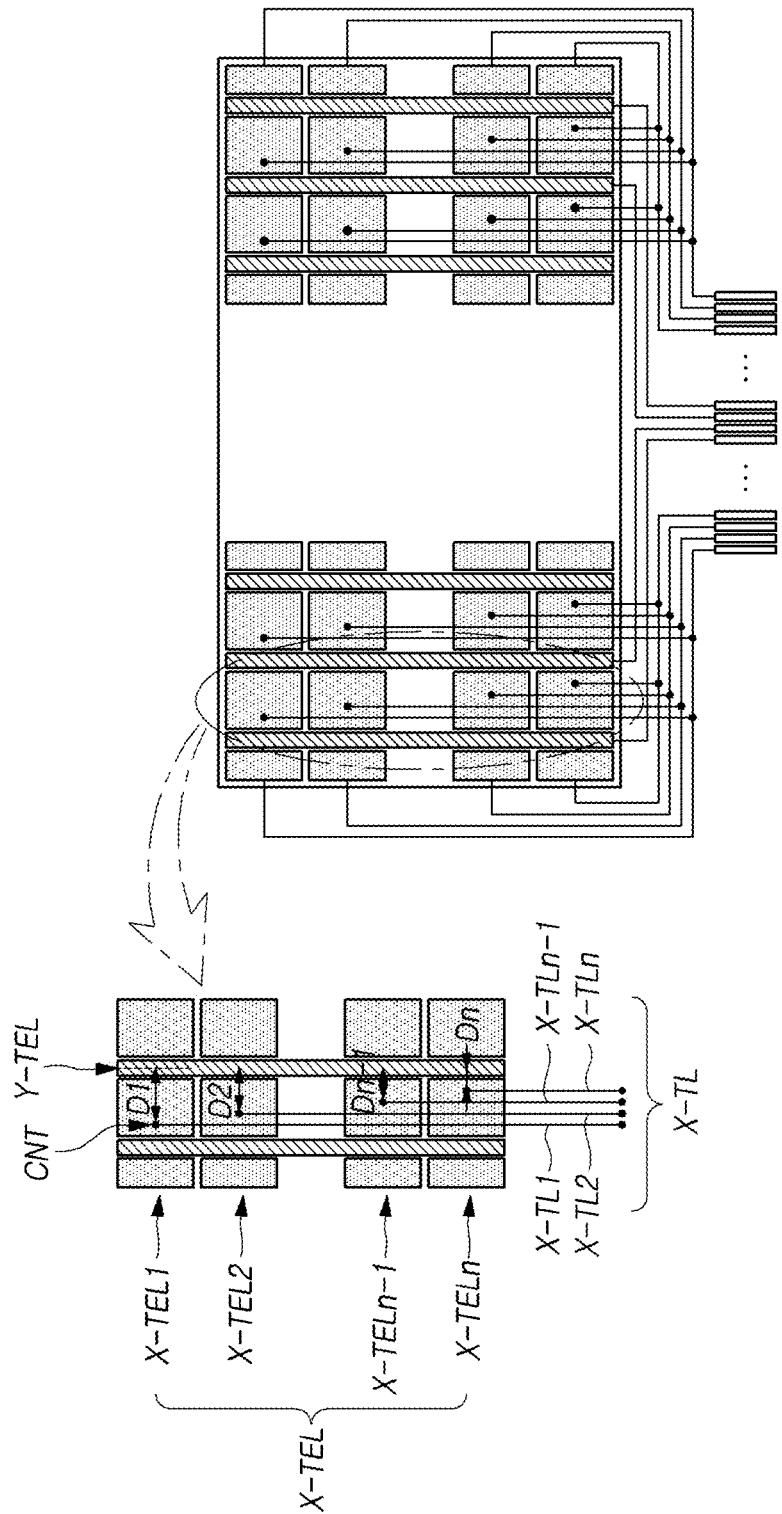
FIG. 7 illustrates an example of an distance between a touch line receiving a touch driving signal and a touch sensing electrode line transmitting a touch sensing signal in a touch display device with a multi-feeding structure.

FIG. 7 illustrates an example of a distance between a touch line receiving a touch driving signal and a touch sensing electrode line transmitting a touch sensing signal in a touch display device with a multi-feeding structure.

Here, it illustrates a structure that the X-touch electrode lines X-TEL1, . . . , X-TELn in the X-axis direction is composed of a plurality of X-touch electrodes corresponding to the touch driving electrodes, and the Y-touch electrode line Y-TEL in the Y-axis direction is composed of one Y-touch electrode corresponding to the touch sensing electrode. Accordingly, a plurality of X-touch electrodes arranged in the same row of the X-axis direction may be connected to the same X-touch line X-TL.

At this time, a touch driving signal may be supplied to the first X-touch electrode line X-TEL1 located at first row through the first X-touch line X-TL1, and a touch driving signal may be supplied to the second X-touch electrode line X-TEL2 located at second row through the second X-touch line X-TL2. Similarly, a touch driving signal may be supplied to the (n−1)th X-touch electrode line X-TELn−1 located at (n−1)th row through the (n−1)th X-touch line X-TLn−1, and a touch driving signal may be supplied to the nth X-touch electrode line X-TELn located at nth row through the nth X-touch line X-TLn.

In this structure, when the X-touch line X-TL is arranged in a straight line, the distances D1, ..., Dn between the Y-touch electrode line Y-TEL corresponding to the touch sensing electrode and the X-touch line X-TL are different for each location of the X-touch electrode line X-TEL due to the location of the contact hole CNT where the X-touch line X-TL and the X-touch electrode line X-TEL are connected.

In the case of FIG. 7, based on the Y-touch electrode line Y-TEL, the first distance D1 between the first X-touch line X-TL1 electrically connected to the first X-touch electrode line X-TEL1 and the Y-touch electrode line Y-TEL, the second distance D2 between the second X-touch line X-TL2 electrically connected to the second X-touch electrode line X-TEL2 and the Y-touch electrode line Y-TEL, the (n−1)th distance Dn−1 between the (n−1)th X-touch line X-TLn−1 electrically connected to (n−1)th X-touch electrode line X-TELn−1 and the Y-touch electrode line Y-TEL, and the nth distance Dn between the nth X-touch line X-TLn electrically connected to the nth X-touch electrode line X-TELn and the Y-touch electrode line Y-TEL may be different.

For this reason, even if a touch occurs at the X-touch electrode at a specific location, it may cause parasitic capacitance due to another X-touch line X-TL passing through the X-touch electrode at a specific location. Accordingly, touch performance may be degraded due to a deviation in parasitic capacitance from a difference in distance from the Y-touch electrode line Y-TEL.

This phenomenon may be especially increased in the case of multi-touch in which a plurality of fingers simultaneously touch a plurality of X-touch electrodes.

Figure 8:
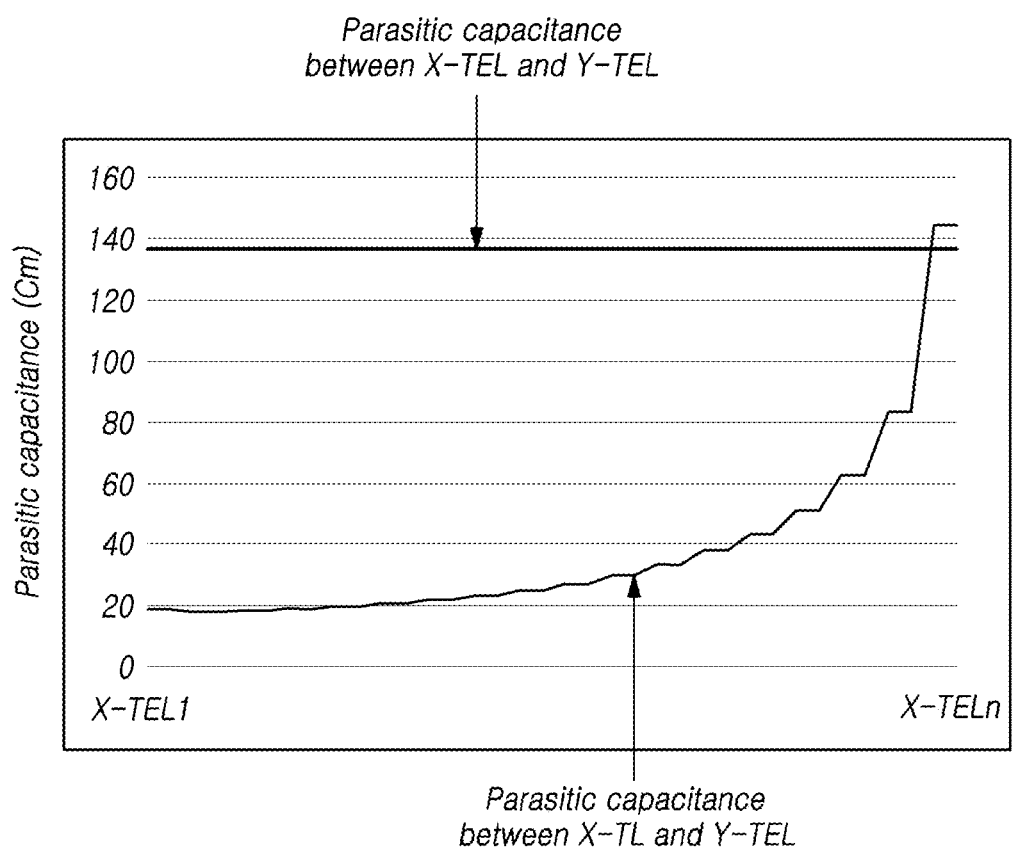
FIG. 8 illustrates an example of parasitic capacitance occurring in a Y-touch electrode line in a touch display device with a multi-feeding structure.

FIG. 8 illustrates an example of parasitic capacitance occurring in a Y-touch electrode line in a touch display device with a multi-feeding structure.

Referring to FIG. 8, the X-touch electrode line X-TEL corresponding to the touch driving electrode is uniformly arranged around the Y-touch electrode line Y-TEL corresponding to the touch sensing electrode in the touch display device 100 with a multi-feeding structure. Accordingly, the parasitic capacitance Cm formed between the X-touch electrode line X-TEL and the Y-touch electrode line Y-TEL may have a uniform distribution.

On the other hand, the distances D1, ..., Dn between the Y-touch electrode line Y-TEL and the X-touch line X-TL are different for each location of the X-touch electrode line X-TEL due to the location of the contact hole where the X-touch line X-TL and the X-touch electrode line X-TEL are connected. Accordingly, the parasitic capacitance Cm formed between the X-touch line X-TL and the Y-touch electrode line Y-TEL may have a non-uniform distribution.

In particular, since a greater number of X-touch lines X-TL may be arranged at a location closer to the touch driving circuit 150, the parasitic capacitance Cm formed between the X-touch line X-TL and the Y-touch electrode line Y-TEL may increase as the location closer to the touch driving circuit 150.

For this reason, in the case that the touch line TL is formed in a multi-feeding structure in order to simultaneously supply a touch driving signal to a plurality of touch driving electrodes constituting the X-touch electrode line X-TEL, touch performance may be degraded and it may be difficult to determine an accurate touch position due to the parasitic capacitance Cm formed between the X-touch line X-TL and the Y-touch electrode line Y-TEL.

In order to solve the above problem, it may uniformly form the distances D1, ..., Dn between the Y-touch electrode line Y-TEL corresponding to touch sensing electrodes and the X-touch line X-TL corresponding to the touch driving line to reduce the deviation of the parasitic capacitance Cm formed between the X-touch line X-TL and the Y-touch electrode line Y-TEL.

Figure 9:
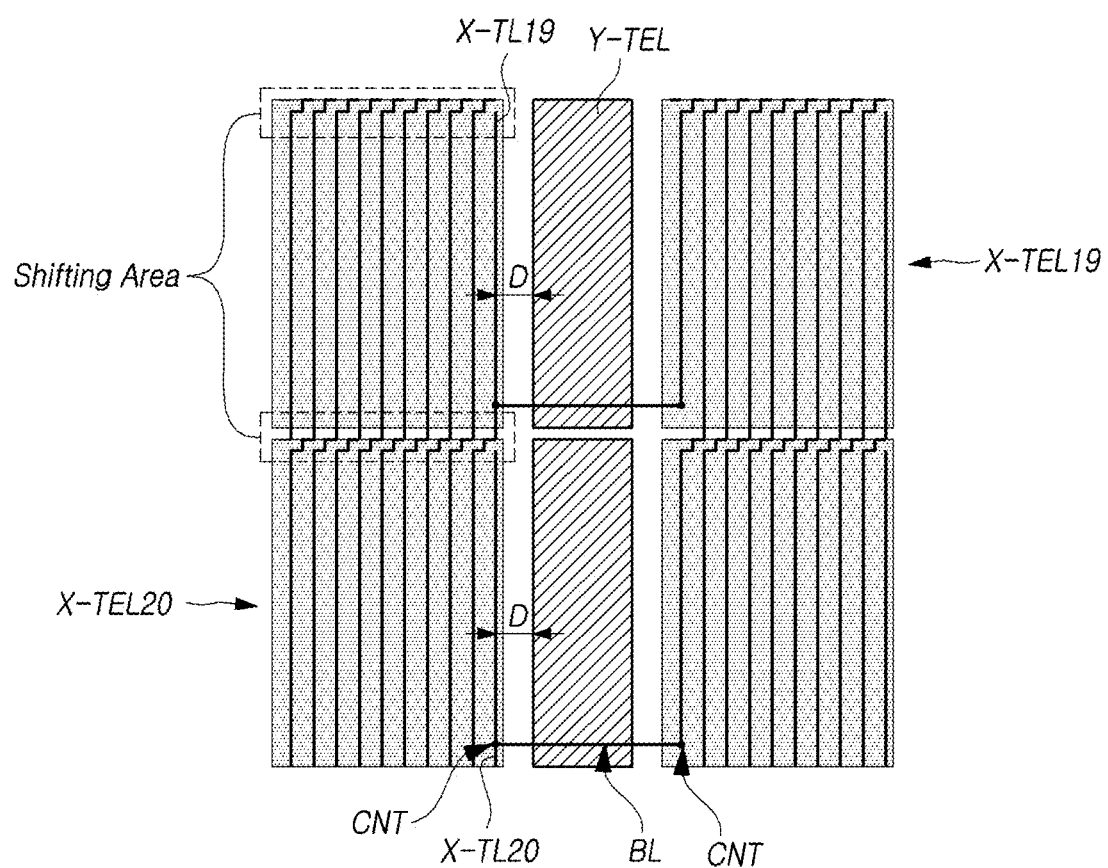
FIG. 9 illustrates a structure of touch lines in a touch display device according to an embodiment of the present disclosure.

FIG. 9 illustrates a structure of touch lines in a touch display device according to an embodiment of the present disclosure.

Referring to FIG. 9, the display panel 110 in the touch display device 100 according to an embodiment of the present disclosure may include an X-touch electrode line X-TEL composed of a plurality of X-touch electrodes arranged in the X-axis direction to simultaneously receive the touch driving signal, a Y-touch electrode line Y-TEL arranged in the Y-axis direction to transmit a touch sensing signal, and a plurality of X-touch lines X-TL that are arranged in the Y-axis direction and electrically connected to a designated X-touch electrode X-TE to transmit a touch driving signal through a contact hole CNT, wherein the plurality of X-touch lines X-TL may be arranged to have uniform distances D between the contact hole CNT connected to the X-touch electrode X-TE and the adjacent Y-touch electrode line Y-TEL.

For example, the 20th X-touch line X-TL20 among the plurality of X-touch lines X-TL closest to the Y-touch electrode line Y-TEL may be electrically connected to the 20th X-touch electrode line X-TEL20 through a contact hole CNT at a point spaced apart from the Y-touch electrode line Y-TEL by a selected distance (or at a predetermined distance) D. Accordingly, the distance between the 20th X-touch line X-TL20 connected to the 20th X-touch electrode line X-TEL20 and the Y-touch electrode line Y-TEL may be D.

Since the 20th X-touch line X-TL20 is electrically connected to the 20th X-touch electrode line X-TEL20 through the contact hole CNT, the 20th X-touch line X-TL20 is extended only to the shifting area and is not be extended to the upper area beyond the 20th X-touch electrode line X-TEL20.

On the other hand, the first X-touch line X-TL1 to the 19th X-touch line X-TL19 may be arranged to be shifted in the direction of the Y-touch electrode line Y-TEL by a selected distance (or at a predetermined distance) from the shifting area of the 20th X-touch electrode line X-TEL20.

At this time, the distance at which the 19th X-touch line X-TL19 is shifted in the shifting area may correspond to the interval between the 19th X-touch line X-TL19 and the 20th X-touch line X-TL20. As a result, the position at which the 19th X-touch line X-TL19 is shifted in the shifting area corresponds to a point where the distance from the Y-touch electrode line Y-TEL is D. Additionally, the point where the 19th X-touch line X-TL19 is connected to the 19th X-touch electrode line X-TEL19 corresponds to a point where the distance from the Y-touch electrode line Y-TEL is D same as the 20th X-touch line X-TL20.

Similarly, the 19th X-touch line X-TL19 may be extended only to the shifting area of the 19th X-touch electrode line X-TEL19 and is not be extended to the upper area beyond the 19th X-touch electrode line X-TEL19.

On the other hand, the first X-touch line X-TL1 to the 18th X-touch line X-TL18 may be arranged to be shifted in the direction of the Y-touch electrode line Y-TEL by a selected distance (or at a predetermined distance) from the shifting area of the 19th X-touch electrode line X-TEL19. As a result, the point where the 18th X-touch line X-TL18 is connected to the 18th X-touch electrode line X-TEL18 may be the point where the distance from the Y-touch electrode line Y-TEL is D.

As described above, the point where each X-touch line X-TL is electrically connected to the X-touch electrode line X-TEL through the contact hole CNT may be arranged to have a uniform distance D from the Y-touch electrode line Y-TEL by shifting the remaining X-touch lines X-TL except for the X-touch line X-TL connected to the X-touch electrode line X-TEL in the shifting area.

At this time, the shifting area in which the X-touch line X-TL is arranged in a shifting structure may correspond to an edge area of the X-touch electrode line X-TEL in order for uniform arrangement with respect to the Y-touch electrode line Y-TEL. For example, when the touch driving circuit 150 is located at lower area of the display panel 110, the shifting area in which the X-touch line X-TL is arranged in a shifting structure may correspond to an upper edge area of the X-touch electrode line X-TEL since the X-touch line X-TL extends from the lower side to the upper side of the display panel 110.

Also, the X-touch electrode lines X-TEL located on both sides of the Y-touch electrode line Y-TEL may be connected through the bridge line BL. At this time, the point where the bridge line BL is connected may correspond to the contact hole CNT where the X-touch line X-TL is electrically connected to the X-touch electrode line X-TEL. In this case, the bridge line BL connecting the X-touch electrode lines X-TEL located on both sides of the Y-touch electrode line Y-TEL and the X-touch line X-TL electrically connected to the X-touch electrode line X-TEL may be connected by one contact hole CNT.

At this time, the contact hole CNT in which the X-touch line X-TL is electrically connected to the X-touch electrode line X-TEL may be formed in a corner area of the X-touch electrode X-TE adjacent to the Y-touch electrode line Y-TEL in order to reduce a parasitic capacitance with the Y-touch electrode line Y-TEL.

In addition, it is beneficial to form the X-touch lines X-TL so as to form a symmetrical structure with respect to the Y-touch electrode line Y-TEL based on the contact hole CNT connected by the bridge line BL for uniform arrangement of the Y-touch electrode line Y-TEL. Here, it illustrates a case in which a touch line with a structure symmetrical to the 20th X-touch line X-TL20 is formed on the right side of the Y-touch electrode line Y-TEL by being connected to the bridge line BL in order to form a symmetrical structure with the 20th X-touch line X-TL20 located on the left side of the Y-touch electrode line Y-TEL.

On the other hand, the touch electrode lines X-TEL, Y-TEL in the touch display device 100 may be of a plate-type without an opening, or may be of a mesh-type with openings for emitting efficiency of subpixels.

Figure 10:
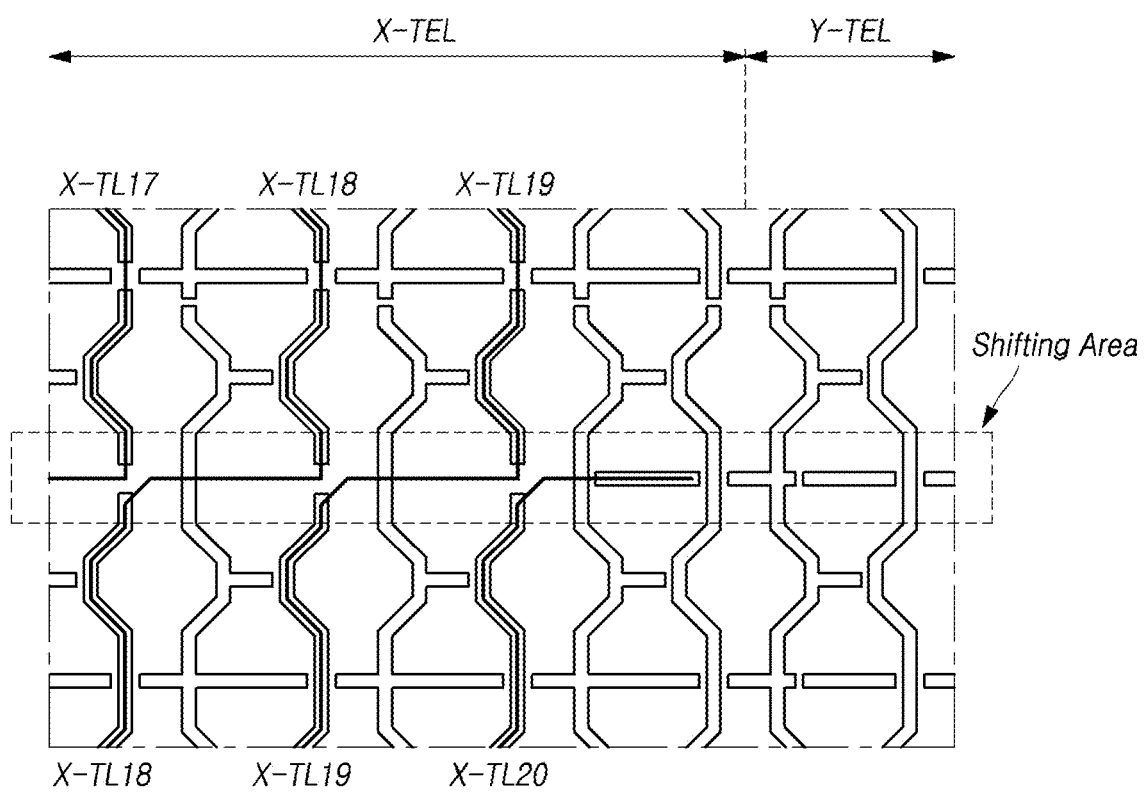
FIG. 10 illustrates a touch line of a shifting area when the touch electrode line is made of a mesh-type in the touch display device according to an embodiment of the present disclosure.

FIG. 10 illustrates an touch line of a shifting area when the touch electrode line is made of a mesh-type in the touch display device according to an embodiment of the present disclosure.

Referring to FIG. 10, the X-touch electrode line X-TEL receiving a touch driving signal and the Y-touch electrode line Y-TEL transmitting a touch sensing signal in the touch display device 100 according to an embodiment of the present disclosure may be formed of a mesh-type with openings.

In this case, the touch electrode lines X-TEL, Y-TEL may extend in a structure in which openings are formed in the center and the touch electrode metal surrounding the openings is repeated. Here, it has illustrated a case in which the touch electrode metal surrounding the openings is formed in an octagonal shape as an example. It could also be a hexagon or other polygon.

At this time, the X-touch line X-TL for supplying the touch driving signal extends along the octagonal touch electrode metal constituting the X-touch electrode line X-TEL, and certain X-touch line X-TL may be electrically connected to the corresponding X-touch electrode line X-TEL through the contact hole CNT at a position spaced apart from the Y-touch electrode line Y-TEL by a uniform distance D.

On the other hand, the touch electrode lines X-TEL, Y-TEL may be made of a transparent electrode or may include a transparent electrode for the emitting efficiency of the subpixel SP.

At this time, the distances D1, ..., Dn between the Y-touch electrode line Y-TEL corresponding to the touch sensing electrode and the X-touch line X-TL corresponding to the touch driving line may be uniformly formed. However, the shifting direction of the X-touch line X-TL in the shifting area may be a horizontal direction or a diagonal direction.

Figure 11:
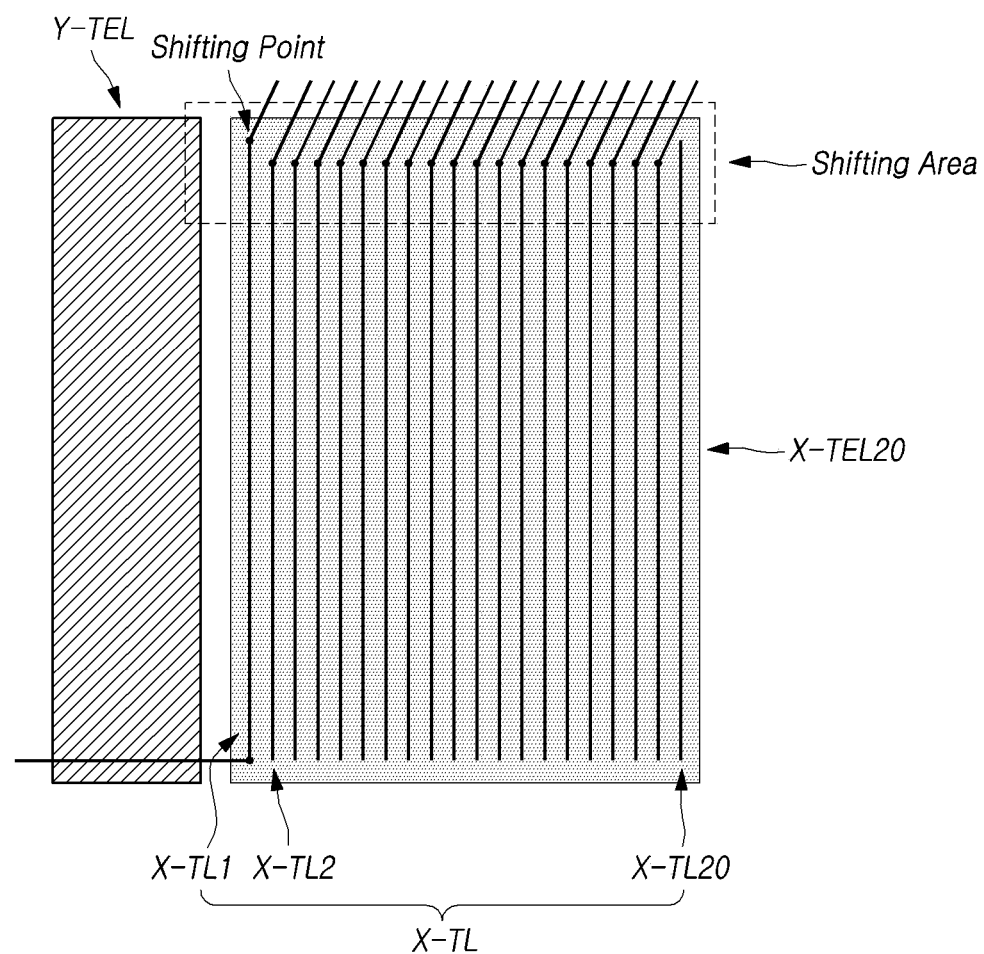
FIG. 11 illustrates a structure in which touch lines are shifted in a diagonal direction in a shifting area in the touch display device according to an embodiment of the present disclosure.

FIG. 11 illustrates an structure in which touch lines are shifted in a diagonal direction in a shifting area in the touch display device according to an embodiment of the present disclosure.

Referring to FIG. 11, when the X-touch lines X-TL are shifted in the horizontal direction in the shifting area in the touch display device 100 according to an embodiment of the present disclosure in order to uniformly form the distances D1, ..., Dn between the Y-touch electrode line Y-TEL and the X-touch lines X-TL, they may electrically contact to the neighboring X-touch lines X-TL.

Therefore, the X-touch lines X-TL may be formed to be shifted in a diagonal direction in the shifting area in order to prevent the X-touch lines X-TL shifted in the shifting area from electrically contacting the adjacent X-touch lines X-TL and secure a stable separation distance.

Also, at least one X-touch line X-TL shifted in a diagonal direction in a shifting area may have a different shifting point according to a location.

For example, when 20 X-touch lines X-TL1~X-TL20 are disposed between the Y-touch electrode lines Y-TEL, and the X-touch line X-TL is shifted to the upper right in the diagonal direction, the X-touch line X-TL does not exist on the left side of the first X-touch line X-TL1. Accordingly, the first X-touch line X-TL1 may have the highest shifting point.

On the other hand, since the second X-touch line X-TL2 to the 19th X-touch line X-TL19 have each X-touch line X-TL on the left side, the shifting point of the second X-touch line X-TL2 to the 19th X-touch line X-TL19 may be formed in a positon lower than the shifting point of the 1st X-touch line X-TL1.

On the other hand, since the 20th X-touch line X-TL20 has a symmetrical relationship with the 1st X-touch line X-TL1, it may have a shifting point at the same location as the 1st X-touch line X-TL1.

Here, it has illustrated a case that the position of the shifting point for at least one of the X-touch lines X-TL is differently located when the X-touch lines X-TL are shifted in the diagonal direction in the shifting area.

Figure 12:
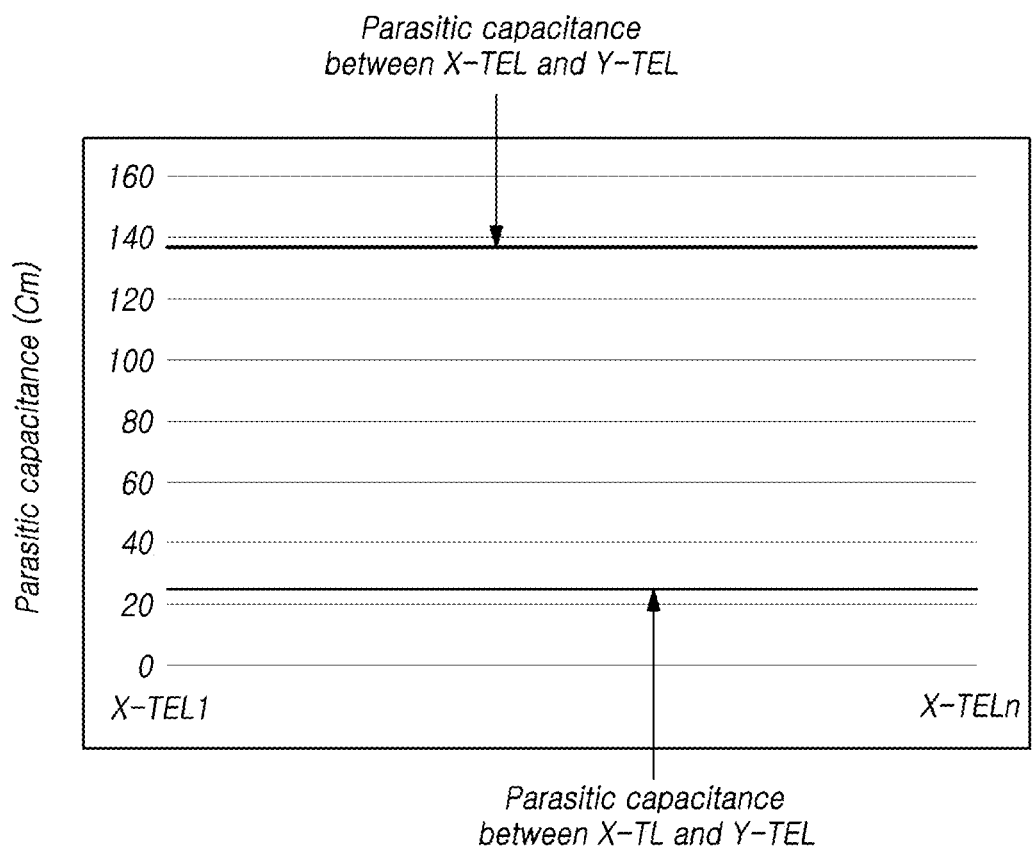
FIG. 12 illustrates an example of parasitic capacitance occurring in a Y-touch electrode line in a touch display device according to an embodiment of the present disclosure.

FIG. 12 illustrates an example of parasitic capacitance occurring in a Y-touch electrode line in a touch display device according to an embodiment of the present disclosure.

Referring to FIG. 12, the touch display device 100 according to an embodiment of the present disclosure may have a uniform parasitic capacitance Cm formed between the X-touch electrode line X-TEL and the Y-touch electrode line Y-TEL since the X-touch electrode line X-TEL corresponding to the touch driving electrode are uniformly arranged around the Y-touch electrode line Y-TEL corresponding to the touch sensing electrode.

In addition, a point where each X-touch line X-TL is electrically connected to the X-touch electrode line X-TEL through the contact hole CNT may be arranged to have a uniform distance from the Y-touch electrode line Y-TEL by shifting the remaining X-touch lines except for the X-touch line X-TL connected to the X-touch electrode line X-TEL in the shifting area. Accordingly, the parasitic capacitance Cm formed between the X-touch line X-TL and the Y-touch electrode line Y-TEL may also be formed with a uniform distribution.

As a result, even though the touch lines TL are arranged in a multi-feeding structure in order to simultaneously supply a touch driving signal to a plurality of touch driving electrodes constituting the X-touch electrode line X-TEL, the touch display device 100 according to the present disclosure may maintain excellent touch performance due to a uniform capacitance formed between the X-touch lines X-TL and the Y-touch electrode line Y-TEL.

Figure 13:
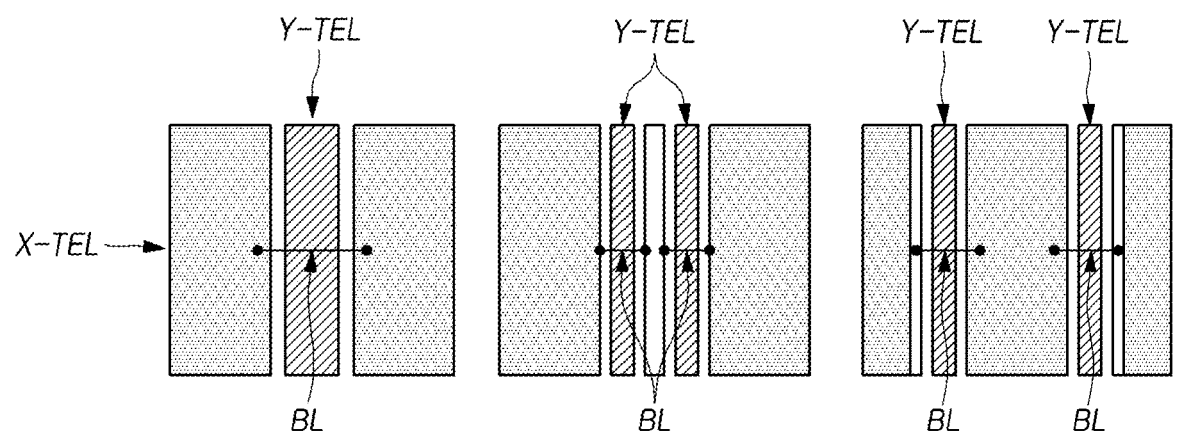
FIGS. 13A, 13B, and 13C illustrate various structures of a touch electrode line in a touch display device according to an embodiment of the present disclosure.

FIGS. 13A, 13B, 13C illustrate various structures of a touch electrode line in a touch display device according to an embodiment of the present disclosure.

Referring to FIGS. 13A, 13B, 13C, the touch display device 100 according to an embodiment of the present disclosure may be formed of touch electrode lines X-TEL, Y-TEL with various structures.

For example, an X-touch electrode line X-TEL may be formed by X-touch electrodes X-TE with same shapes on both sides of the X-axis direction based on the Y-touch electrode line Y-TEL with a single bar structure extending in the Y-axis direction (as shown in FIG. 13A).

Alternatively, a Y-touch electrode line Y-TEL consisting of two bars may be arranged in a split structure based on an X-touch electrode X-TE with a thin structure, and an X-touch electrode line X-TEL may be formed by X-touch electrodes X-TE with same shapes on both sides of the X-axis direction based on the Y-touch electrode line Y-TEL with two bar structure, and the X-touch electrode X-TE with a thin structure (as shown in FIG. 13B).

Alternatively, it may have a structure in which the width of the X-touch electrode lines X-TEL located on both outsides of the Y-touch electrode lines Y-TEL consisting of two bars is smaller than the width of the X-touch electrode line X-TEL located between the Y-touch electrode lines Y-TEL consisting of two bars (as shown in FIG. 13C).

In this case, the X-touch electrode lines X-TEL separated by the Y-touch electrode line Y-TEL may be connected to each other through the bridge line BL.

The structure of these touch electrode lines X-TEL, Y-TEL may be variously amended according to the size or use of the touch display device 100.

On the other hand, the contact hole CNT through which the X-touch line X-TL is electrically connected to the X-touch electrode line X-TEL may be formed in a certain distance D spaced apart from the Y-touch electrode line Y-TEL. It may be effectively determined according to the shape of the display panel 110.

On the other hand, recently, as the touch display device 100 is used as a display device in various fields such as a watch or a vehicle instrument panel, a non-squared display screen is beneficial (such shapes may include a circle-shaped display panel, a rounded-edge shape display panel, a polygonal-shaped display panel, or the like). Accordingly, the display panel 100 may be made of a structure such as a circle rather than a square.

Figure 14:
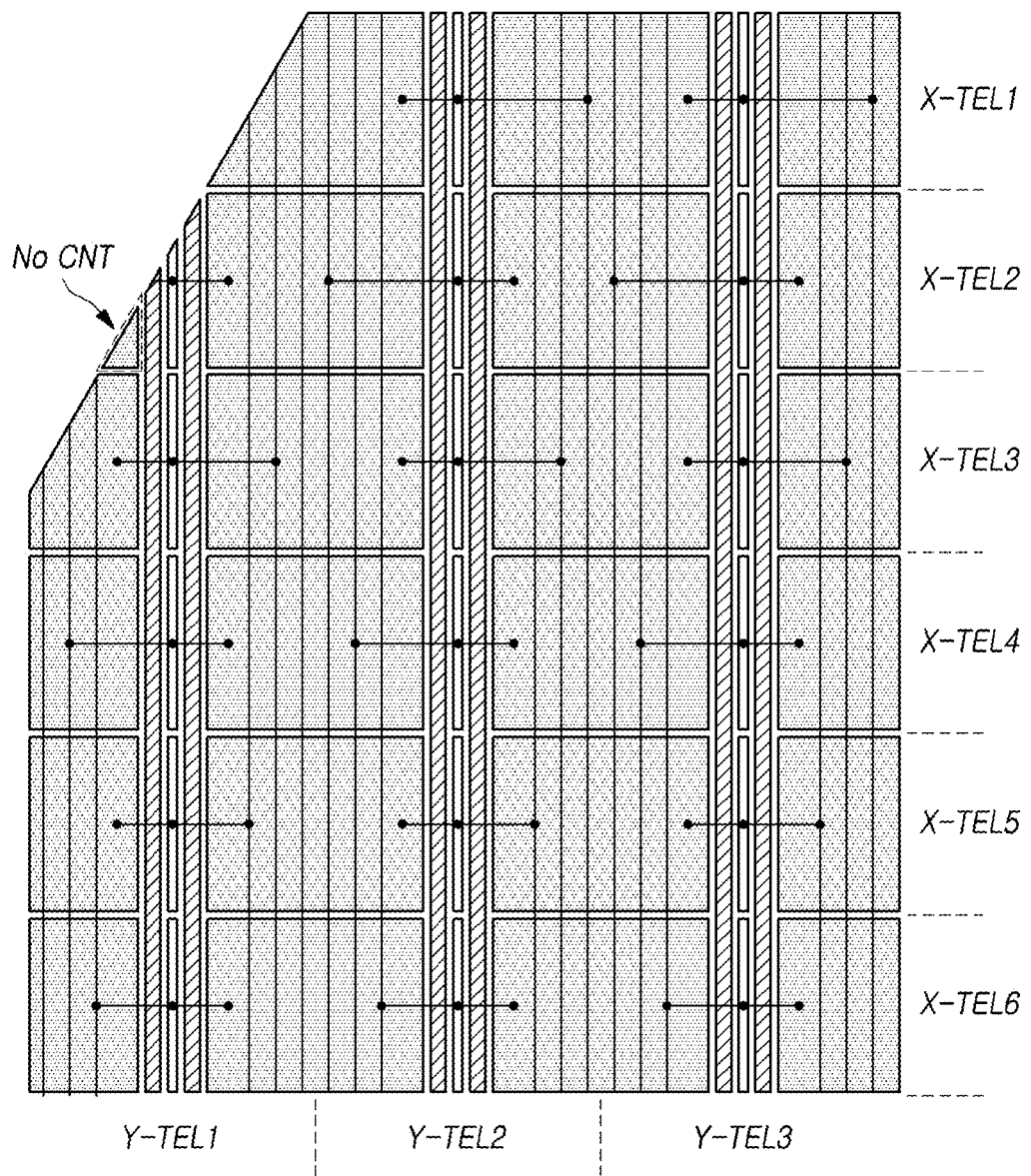
FIG. 14 illustrates a structure of touch electrode lines and touch lines formed on a non-squared display panel.

FIG. 14 illustrates a structure of touch electrode lines and touch lines formed on a non-squared display panel.

Referring to FIG. 14, when the display panel 110 of the touch display device 100 is formed of a non-squared display panel 110 such as a circular display panel 110, a non-squared area in which a contact hole CNT for electrically connecting to the X-touch line TL cannot be located may be formed in an outside of the active area for displaying an image.

For example, when the non-squared area in which the touch electrode is not formed is located in the upper left side of the display panel 110, a contact hole CNT for connecting to the X-touch line X-TL may not be formed in the X-touch electrode line X-TEL1 located in the upper left edge area based on the central portion of the active area in the display panel 110.

Conversely, when the non-squared area in which the touch electrode is not formed is located in the upper right side of the display panel 110, a contact hole CNT for connecting to the X-touch line X-TL may not be formed in the X-touch electrode line X-TEL1 located in the upper right edge area based on the central portion of the active area in the display panel 110.

Therefore, a voltage deviation may occur between the touch area to which the touch driving signal is supplied and the area to which the touch driving signal is not supplied through the X-touch line X-TL, and as a result, a vertical line may occur due to luminance deviation. Accordingly, the luminance deviation may be occurred at the edge line of the active area since the touch lines X-TL and the contact holes CNT are not uniformly formed in an area adjacent to the edge area of the active area in the circular display panel 110.

Accordingly, it is beneficial to arrange a position of the contact holes CNT for connecting the X-touch lines X-TL supplying the touch driving signal with the X-touch electrode line X-TEL at a position opposite to the non-squared area in order to form a contact hole CNT for connecting the X-touch lines X-TL to the X-touch electrode line X-TEL.

Figure 15:
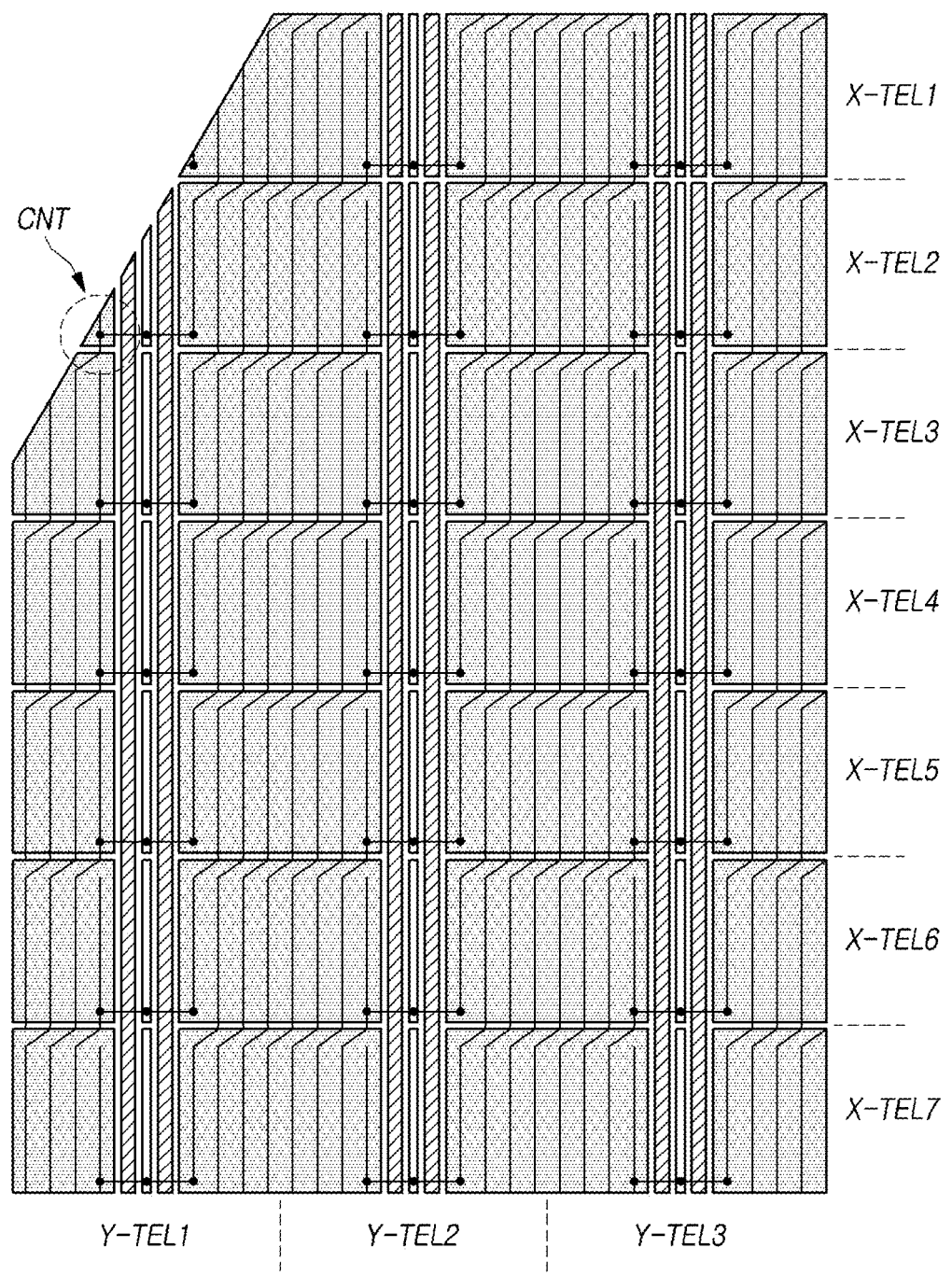
FIG. 15 illustrates a touch electrode lines and touch lines arranged on a non-squared display panel in a touch display device according to an embodiment of the present disclosure.

FIG. 15 illustrates a touch electrode lines and touch lines arranged on a non-squared display panel in a touch display device according to an embodiment of the present disclosure.

Referring to FIG. 15, when the non-squared area in which the touch electrodes are not formed is located on the upper left side of the display panel 110, a contact hole CNT for connecting the X-touch electrode line X-TEL1 to the X-touch line X-TL may be located in the lower right side.

As a result, it may reduce the area in which the contact hole CNT for connecting the X-touch electrode line X-TEL1 to the X-touch line X-TL is not formed, and it may improve the touch performance at the edge area.

On the other hand, when the non-squared area in which the touch electrodes are not formed is located on the upper right side of the display panel 110, a contact hole CNT for connecting the X-touch electrode line X-TEL1 to the X-touch line X-TL may be located in the lower left side.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A touch display device comprising:
a display panel including:
a substrate having thereon a plurality of subpixels, and
an encapsulation layer disposed on the substrate,
a touch screen panel disposed on the encapsulation layer, the touch screen panel including:
a plurality of touch driving electrodes configured to receive touch driving signals through a plurality of touch driving lines,
a plurality of touch sensing electrodes, in operation, forming capacitances with the plurality of touch driving electrodes, the plurality of touch sensing electrodes configured to supply touch sensing signals through a plurality of touch sensing lines; and
a bridge line electrically connecting to at least two of the plurality of touch driving electrodes,
wherein the plurality of touch driving electrodes and the plurality of touch sensing electrodes are formed in a mesh-type shape having openings,
wherein the plurality of touch driving lines is disposed for a corresponding touch driving electrode of the plurality of touch driving electrodes,
wherein remaining touch driving lines of the plurality of touch driving lines except for a touch driving line electrically connected to the corresponding touch driving electrode are each shifted by a same distance in a direction different from a direction of their main extent within an area of the corresponding touch driving electrode, and
wherein the bridge line overlaps with at least one of the plurality of touch sensing electrodes.

2. The touch display device according to claim 1, wherein the plurality of touch driving lines extends along a touch electrode metal constituting the mesh-type shape of the plurality of touch driving electrodes.

3. The touch display device according to claim 2, wherein the mesh-type shape having openings are repeated in a structure with the openings formed in a center and the touch electrode metal laterally surrounding the openings.

4. The touch display device according to claim 3, wherein the touch electrode metals laterally surrounding the openings form a polygon type opening in a general shape of an octagon.

5. The touch display device of claim 4, wherein the plurality of touch driving lines are extended along the octagonal-like shaped touch electrode metal constituting the plurality of touch driving electrodes, and each of the plurality of touch driving lines is electrically connected to the corresponding touch driving electrodes through a contact hole.

6. The touch display device of claim 5, wherein distances between a plurality of contact holes coupled to the plurality of touch driving lines and adjacent a plurality of touch sensing electrode lines is uniformly formed.

7. The touch display device according to claim 1, wherein each of the plurality of touch driving lines is electrically connected to the corresponding touch driving electrodes.

8. The touch display device of claim 1, wherein the plurality of touch driving electrodes and the plurality of touch sensing electrodes include a transparent electrode for the plurality of subpixels.

9. The touch display device of claim 1, wherein a shifting direction of the plurality of touch driving lines is either a horizontal direction or a diagonal direction.

10. The touch display device of claim 1, wherein the display panel is a non-squared display panel, and a non-squared area in which a plurality of contact holes for electrically connecting to the plurality of touch driving lines are not located in an outside of an active area for displaying an image.

11. The touch display device of claim 10, wherein the non-squared display panel includes a circular display panel.

12. The touch display device of claim 10, wherein the plurality of contact holes electrically connected to the plurality of touch driving lines are formed at a location opposite to the non-squared area.

13. The touch display device according to claim 1, wherein the bridge lines electrically connecting the at least two of the plurality of touch driving electrodes located on both sides of at least one of the plurality of touch sensing electrodes.

14. A display panel comprising:
a substrate having thereon a plurality of subpixels;
an encapsulation layer disposed on the substrate; and
a touch screen panel disposed on the encapsulation layer, the touch screen panel including a plurality of touch electrodes;
wherein the plurality of touch electrodes includes:
a plurality of touch driving electrodes configured to receive touch driving signals through a plurality of touch driving lines;
a plurality of touch sensing electrodes, in operation, forming capacitances with the plurality of touch driving electrodes, the plurality of touch sensing electrodes configured to supply touch sensing signals through a plurality of touch sensing lines; and
a bridge line electrically connecting to at least two of the plurality of touch driving electrodes,
wherein the plurality of touch driving electrodes and the plurality of touch sensing electrodes are formed in a mesh-type shape having openings,
wherein the plurality of touch driving lines is disposed for a corresponding touch driving electrode of the plurality of touch driving electrodes,
wherein remaining touch driving lines of the plurality of touch driving lines except for a touch driving line electrically connected to the corresponding touch driving electrode are each shifted by a same distance in a direction different from a direction of their main extent within an area of the corresponding touch driving electrode, and wherein the bridge line overlaps with at least one of the plurality of touch sensing electrodes from a plan view.

15. The touch display device of claim 14, wherein the plurality of touch driving lines extends along a touch electrode metal constituting the mesh-type shape of the plurality of touch driving electrodes.

16. The touch display device according to claim 15, wherein the mesh-type shape having openings are repeated in a structure with the openings formed in a center and the touch electrode metal laterally surrounding the openings.

17. The touch display device according to claim 16, wherein the touch electrode metal laterally surrounding the openings are curved to form a polygonal-like shape around the opening.

18. The touch display device of claim 17, wherein the plurality of touch driving lines are extended along the polygonal-like shaped touch electrode metals constituting the plurality of touch driving electrodes, and each of the plurality of touch driving lines is electrically connected to the corresponding touch driving electrodes through a contact hole.

19. The touch display device of claim 17, wherein distances between a plurality of contact holes coupled to the plurality of touch driving lines and adjacent a plurality of touch sensing electrode lines is constant.

20. The touch display device of claim 14, wherein the plurality of touch driving electrodes and the plurality of touch sensing electrodes are made of a transparent electrode for the plurality of subpixels.

21. The touch display device of claim 14, wherein a shifting direction of the plurality of touch driving is either a horizontal direction or a diagonal direction.

22. The touch display device according to claim 14, wherein the bridge lines electrically connecting the at least two of the plurality of touch driving electrodes located on both sides of at least one of the plurality of touch sensing electrodes.

* * * * *